US012782850B2

(12) United States Patent
Ariizumi et al.

(10) Patent No.: US 12,782,850 B2
(45) Date of Patent: Nov. 3, 2026

(54) DEVELOPING DEVICE

(71) Applicant: CANON KABUSHIKI KAISHA, Tokyo (JP)

(72) Inventors: Osamu Ariizumi, Chiba (JP); Naonari Hashimura, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/920,019

(22) Filed: Oct. 18, 2024

(65) Prior Publication Data

US 2025/0138452 A1 May 1, 2025

(30) Foreign Application Priority Data

Oct. 30, 2023 (JP) ................................ 2023-185954
Oct. 4, 2024 (JP) ................................ 2024-174696

(51) Int. Cl.
*G03G 15/09* (2006.01)
*G03G 15/01* (2006.01)
*G03G 15/08* (2006.01)

(52) U.S. Cl.
CPC ..... *G03G 15/0921* (2013.01); *G03G 15/0121* (2013.01); *G03G 15/0189* (2013.01); *G03G 15/0891* (2013.01)

(58) Field of Classification Search
CPC ........... G03G 15/0921; G03G 15/0121; G03G 15/0189; G03G 15/0891; G03G 2215/0648
See application file for complete search history.

(56) References Cited

U.S. PATENT DOCUMENTS

| | | | | |
|---|---|---|---|---|
| 5,545,840 | A | 8/1996 | Doi et al. | |
| 8,892,009 | B2 | 11/2014 | Furuya et al. | |
| 8,989,637 | B2 | 3/2015 | Yoshii | |
| 11,846,898 | B2 | 12/2023 | Tanaka | |
| 11,852,989 | B2 | 12/2023 | Ariizumi | |
| 12,197,147 | B2 | 1/2025 | Tanaka | |
| 2004/0022560 | A1 * | 2/2004 | Hirobe | G03G 15/0921 399/269 |
| 2004/0076454 | A1 | 4/2004 | Nishiyama | |
| 2005/0238390 | A1 * | 10/2005 | Fukuda | G03G 15/0813 399/267 |
| 2010/0196045 | A1 | 8/2010 | Kabashima | |

(Continued)

FOREIGN PATENT DOCUMENTS

| | | |
|---|---|---|
| JP | H09-120214 A | 5/1997 |
| JP | H11-327308 A | 11/1999 |

(Continued)

*Primary Examiner* — Sandra Brase
(74) *Attorney, Agent, or Firm* — VENALBE LLP

(57) ABSTRACT

A developing device includes a developing container to accommodate a developer, a first rotatable member which carries and feeds the developer to a first developing position where an electrostatic latent image formed on an image bearing member is developed, and a first magnet provided non rotatably and stationarily inside the first rotatable member. A second rotatable member is provided opposed to the first rotatable member and carries and feeds the developer to a second developing position where the electrostatic latent image is developed. A second magnet is provided non rotatably and stationarily inside the second rotatable member and includes a plurality of magnetic poles.

17 Claims, 19 Drawing Sheets

(56) References Cited

U.S. PATENT DOCUMENTS

| | | | | |
|---|---|---|---|---|
| 2013/0101320 | A1 | 4/2013 | Okamoto et al. | |
| 2013/0243493 | A1 | 9/2013 | Yoshioka et al. | |
| 2013/0330107 | A1 | 12/2013 | Itagaki et al. | |
| 2014/0016969 | A1 | 1/2014 | Yoshii | |
| 2014/0023408 | A1 * | 1/2014 | Kato .................. | G03G 15/0818 399/269 |
| 2014/0140739 | A1 * | 5/2014 | Sato ................... | G03G 15/0921 399/269 |
| 2018/0143581 | A1 * | 5/2018 | Nakayama ......... | G03G 15/0907 |
| 2018/0341198 | A1 | 11/2018 | Sakamaki et al. | |
| 2019/0250531 | A1 | 8/2019 | Shigehiro | |
| 2019/0332034 | A1 | 10/2019 | Okamura et al. | |
| 2024/0272564 | A1 | 8/2024 | Tanaka | |
| 2024/0272565 | A1 | 8/2024 | Ariizumi | |
| 2025/0138450 | A1 | 5/2025 | Tanaka et al. | |
| 2025/0138451 | A1 | 5/2025 | Ohkubo et al. | |

FOREIGN PATENT DOCUMENTS

| | | | |
|---|---|---|---|
| JP | 2014-016554 | A | 1/2014 |
| JP | 2014-021332 | A | 2/2014 |
| JP | 2014-238514 | A | 12/2014 |
| JP | 2018-142031 | A | 9/2018 |
| JP | 2019-191485 | A | 10/2019 |

* cited by examiner

| | MAGNETIC FLUX DENSITY [mT] | | | DISTANCE [mm] | | ABNORMAL IMAGE |
|---|---|---|---|---|---|---|
| | MA | MB | MC | L1 | L2 | STRIPE FOG |
| REF | 85 | 85 | 35 | 10 | 8.4 | × |
| STUDY 1 | 85 | 70 | 35 | 10 | 8.4 | △ |
| STUDY 2 | 85 | 50 | 35 | 10 | 8.4 | ○ |
| STUDY 3 | 85 | 40 | 35 | 10 | 8.4 | ◎ |
| STUDY 4 | 85 | 85 | 60 | 10 | 8.4 | ○ |
| STUDY 5 | 85 | 69 | 60 | 10 | 8.4 | ◎ |

Fig. 8

| | MAGNETIC FLUX DENSITY [mT] | | | DISTANCE [mm] | | ABNORMAL IMAGE |
|---|---|---|---|---|---|---|
| | MA | MB | MC | L1 | L2 | STRIPE FOG |
| REF | 85 | 85 | 35 | 10 | 8.4 | × |
| STUDY 6 | 85 | 85 | 35 | 13 | 8.4 | ○ |
| STUDY 7 | 85 | 85 | 35 | 15 | 8.4 | ◎ |

Fig. 10

| | MAGNETIC FLUX DENSITY [mT] | | | DISTANCE [mm] | | ABNORMAL IMAGE |
|---|---|---|---|---|---|---|
| | MB | MA | MD | L1 | L3 | STRIPE FOG |
| REF | 85 | 85 | 55 | 10 | 8.3 | × |
| STUDY 8 | 85 | 80 | 55 | 10 | 8.3 | △ |
| STUDY 9 | 85 | 70 | 55 | 10 | 8.3 | ○ |
| STUDY 10 | 85 | 60 | 55 | 10 | 8.3 | ◎ |
| STUDY 11 | 85 | 85 | 65 | 10 | 8.3 | ○ |
| STUDY 12 | 85 | 66 | 65 | 10 | 8.3 | ◎ |

Fig. 15

| | MAGNETIC FLUX DENSITY [mT] | | | DISTANCE [mm] | | ABNORMAL IMAGE |
|---|---|---|---|---|---|---|
| | MB | MA | MD | L1 | L3 | STRIPE FOG |
| REF | 85 | 85 | 55 | 10 | 8.3 | × |
| STUDY 13 | 85 | 85 | 55 | 11 | 8.3 | ○ |
| STUDY 14 | 85 | 85 | 55 | 13 | 8.3 | ◎ |

Fig. 17

DEVELOPING DEVICE

FIELD OF THE INVENTION AND RELATED ART

The present invention relates to a developing device for developing an electrostatic latent image, formed on an image bearing member, with a developer.

As the developing device, a constitution in which two developing rollers for developing the electrostatic latent image, formed on the image bearing member, with the developer are arranged side by side with respect to a rotational direction of the image bearing member is proposed (United States Patent Application Publication No. 2013/0330107). In the developing device disclosed in US2013/0330107 A1, of the two developing rollers, to a first developing roller positioned at a lower portion in the vertical direction, the developer is supplied from a supplying portion, and to a second developing roller positioned at an upper portion in the vertical direction, the developer is delivered from the first developing roller positioned at the lower portion.

As disclosed in US2013/0330107 A1, in the case where the developer is delivered from the first developing roller to the second developing roller positioned at the upper portion in the vertical direction, delivery of the developer is made by a magnetic field formed between a delivering pole of a first magnet provided in the first developing roller and a receiving pole of a second magnet provided in the second developing roller. The delivering pole is opposite in polarity to the receiving pole. In such a constitution, when a rotational direction of the second developing roller is opposite to a rotational direction of the first developing roller in a position where the second developing roller opposes the first developing roller, a first magnetic pole adjacent to the delivering pole on a side upstream of the delivering pole is opposite in polarity to a second magnetic pole adjacent to the receiving pole on a side downstream of the receiving pole. For this reason, between the first magnetic pole and the second magnetic pole, a magnetic field for attracting the developer to each of the rollers is generated.

Thus, the magnetic field for attracting the developer is generated between the first magnetic pole and the second magnetic pole, there is a liability that movement of the developer is generated between the first magnetic pole and the second magnetic pole by this magnetic field. Further, when the developer movement is generated between the first magnetic pole and the second magnetic pole, there is a liability that the moving developer floats and then is deposited on an image bearing member positioned in the neighborhood of the first developing roller and the second developing roller. Thus, when the developer is deposited on the image bearing member, an image defect such as a fog in a vertical stripe shape occurs on an output image.

SUMMARY OF THE INVENTION

A principal object of the present invention is to provide a developing device capable of suppressing an occurrence of an image defect.

According to an aspect of the present invention, there is provided a developing device comprising: a developing container configured to accommodate a developer including toner and a carrier; a first rotatable member to which the developer accommodated in the developing container is supplied and which carries and feeds the developer to a first developing position where an electrostatic latent image formed on an image bearing member is developed; a first magnet provided non-rotatably and stationarily inside the first rotatable member, wherein the first magnet includes a first developing pole provided opposed to the image bearing member in the first developing position, a delivering pole provided downstream of the first developing pole with respect to a rotational direction of the first rotatable member, and a first feeding pole provided upstream of the delivering pole and adjacent to the delivering pole, with respect to the rotational direction of the first rotatable member, and having a magnetic polarity different from the delivering pole; a second rotatable member provided opposed to the first rotatable member and to which the developer is delivered from the first rotatable member by a magnetic field generated by the first magnet, wherein the second rotatable member carries and feeds the developer to a second developing position where the electrostatic latent image is developed, and wherein a rotational direction of the second rotatable member in a position where on an outer peripheral surface of the second rotatable member, the second rotatable member is closest to the first rotatable member is opposite to the rotational direction of the first rotatable member in a position where on an outer peripheral surface of the first rotatable member, the first rotatable member is closest to the second rotatable member; and a second magnet provided non-rotatably and stationarily inside the second rotatable member, wherein the second magnet includes a plurality of magnetic poles including a second developing pole provided opposed to the image bearing member in the second developing position, a receiving pole provided upstream of the second developing pole with respect to the rotational direction of the second rotatable member and having a magnetic polarity different from that of the delivering pole, and a second feeding pole provided downstream of the receiving pole and adjacent to the receiving pole, with respect to the rotational direction of the second rotatable member, and having a magnetic polarity different from that of the receiving pole, the receiving pole being a magnetic pole, of the plurality of magnetic poles, provided closest to the delivering pole, wherein in a case where an absolute value of a maximum of a magnetic flux density of the second feeding pole in a normal direction relative to an outer peripheral surface of the second rotatable member is MA, a position, on the outer peripheral surface of the second rotatable member, where the magnetic flux density of the second feeding pole in the normal direction relative to the outer peripheral surface of the second rotatable member is maximum is a point A, an absolute value of a maximum of a magnetic flux density of the first feeding pole in a normal direction relative to an outer peripheral surface of the first rotatable member is MB, a position, on the outer peripheral surface of the first rotatable member, where the magnetic flux density of the first feeding pole in the normal direction relative to the outer peripheral surface of the first rotatable member is maximum is a point B, an absolute value of a maximum of a magnetic flux density of the delivering pole in the normal direction relative to an outer peripheral surface of the first rotatable member is MC, a position, on the outer peripheral surface of the first rotatable member, where the magnetic flux density of the delivering pole in the normal direction relative to the outer peripheral surface of the first rotatable member is maximum is a point C, a rectilinear line distance between the point A and the point B is L1, a rectilinear line distance between the point A and the point C is L2, and an angle formed by a rectilinear line AB connecting the point A and the point B and a rectilinear line AC connecting the point A and the point C is θ, the following relationship is satisfied: $MB/L1^2 \leq (MC/L2^2) \times \cos\theta$.

According to another aspect of the present invention, there is provided a developing device comprising: a developing container configured to accommodate a developer including toner and a carrier; a first rotatable to which the developer accommodated in the developing container is supplied and which carries and feeds the developer to a first developing position where an electrostatic latent image formed on an image bearing member is developed; a first magnet provided non-rotatably and stationarily inside the first rotatable member, wherein the first magnet includes a first developing pole provided opposed to the image bearing member in the first developing position, a delivering pole provided downstream of the first developing pole with respect to a rotational direction of the first rotatable member, and a first feeding pole provided upstream of the delivering pole and adjacent to the delivering pole, with respect to the rotational direction of the first rotatable member, and having a magnetic polarity different from the delivering pole; a second rotatable member provided opposed to the first rotatable member and to which the developer is delivered from the first rotatable member by a magnetic field generated by the first magnet, wherein the second rotatable member carries and feeds the developer to a second developing position where the electrostatic latent image is developed, and wherein a rotational direction of the second rotatable member in a position where on an outer peripheral surface of the second rotatable member, the second rotatable member is closed to the first rotatable member is opposite to the rotational direction of the first rotatable member in a position where on an outer peripheral surface of the first rotatable member, the first rotatable member is closest to the second rotatable member; and a second magnet provided non-rotatably and stationarily inside the second rotatable member, wherein the second magnet includes a plurality of magnetic poles including a second developing pole provided opposed to the image bearing member in the second developing position, a receiving pole provided upstream of the second developing pole with respect to the rotational direction of the second rotatable member and having a magnetic polarity different from that of the delivering pole, and a second feeding pole provided downstream of the receiving pole and adjacent to the receiving pole, with respect to the rotational direction of the second rotatable member, and having a magnetic polarity different from that of the receiving pole, the receiving pole being a magnetic pole, of the plurality of magnetic poles, provided closest to the delivering pole, wherein in a case where an absolute value of a maximum of a magnetic flux density of the second feeding pole in a normal direction relative to an outer peripheral surface of the second rotatable member is MA, a position, on the outer peripheral surface of the second rotatable member, where the magnetic flux density of the second feeding pole in the normal direction relative to the outer peripheral surface of the second rotatable member is maximum is a point A, an absolute value of a maximum of a magnetic flux density of the first feeding pole in a normal direction relative to an outer peripheral surface of the first rotatable member is MB, a position, on the outer peripheral surface of the first rotatable member, where the magnetic flux density of the first feeding pole in the normal direction relative to the outer peripheral surface of the first rotatable member is maximum is a point B, an absolute value of a maximum of a magnetic flux density of the receiving pole in the normal direction relative to an outer peripheral surface of the second rotatable member is MD, a position, on the outer peripheral surface of the second rotatable member, where the magnetic flux density of the receiving pole in the normal direction relative to the outer peripheral surface of the second rotatable member is maximum is a point D, a rectilinear line distance between the point A and the point B is L1, a rectilinear line distance between the point B and the point D is L3, and an angle formed by a rectilinear line AB connecting the point A and the point B and a rectilinear line BD connecting the point B and the point D is θ', the following relationship is satisfied: $MA/L1^2 \leq (MD/L3^2) \times \cos\theta'$.

According to another aspect of the present invention, there is provided a developing device comprising: a developing container configured to accommodate a developer including toner and a carrier; a first rotatable to which the developer accommodated in the developing container is supplied and which carries and feeds the developer to a first developing position where an electrostatic latent image formed on an image bearing member is developed; a first magnet provided non-rotatably and stationarily inside the first rotatable member, wherein the first magnet includes a first developing pole provided opposed to the image bearing member in the first developing position, and a delivering pole provided downstream of the first developing pole and adjacent to the delivering pole, with respect to the rotational direction of the first rotatable member, and having a magnetic polarity different from the delivering pole; a second rotatable member provided opposed to the first rotatable member and to which the developer is delivered from the first rotatable member by a magnetic field generated by the first magnet, wherein the second rotatable member carries and feeds the developer to a second developing position where the electrostatic latent image is developed, and wherein a rotational direction of the second rotatable member in a position where on an outer peripheral surface of the second rotatable member, the second rotatable member is closed to the first rotatable member is opposite to the rotational direction of the first rotatable member in a position where on an outer peripheral surface of the first rotatable member, the first rotatable member is closest to the second rotatable member; and a second magnet provided non-rotatably and stationarily inside the second rotatable member, wherein the second magnet includes a plurality of magnetic poles including a second developing pole provided opposed to the image bearing member in the second developing position, a receiving pole provided upstream of the second developing pole with respect to the rotational direction of the second rotatable member and having a magnetic polarity different from that of the delivering pole, and a feeding pole provided downstream of the receiving pole and adjacent to the receiving pole, with respect to the rotational direction of the second rotatable member, and having a magnetic polarity different from that of the receiving pole, the receiving pole being a magnetic pole, of the plurality of magnetic poles, provided closest to the delivering pole.

According to a further aspect of the present invention, there is provided a developing device comprising: a developing container configured to accommodate a developer including toner and a carrier; a first rotatable to which the developer accommodated in the developing container is supplied and which carries and feeds the developer to a first developing position where an electrostatic latent image formed on an image bearing member is developed; a first magnet provided non-rotatably and stationarily inside the first rotatable member, wherein the first magnet includes a first developing pole provided opposed to the image bearing member in the first developing position, a delivering pole provided downstream of the first developing pole with respect to a rotational direction of the first rotatable member, and a feeding pole provided upstream of the delivering pole and adjacent to the delivering pole, with respect to the rotational direction of the first rotatable member, and having a magnetic polarity different from the delivering pole; a second rotatable member provided opposed to the first rotatable member and to which the developer is delivered from the first rotatable member by a magnetic field generated by the first magnet, wherein the second rotatable member carries and feeds the developer to a second developing position where the electrostatic latent image is developed, and wherein a rotational direction of the second rotatable member in a position where on an outer peripheral surface of the second rotatable member, the second rotatable member is closed to the first rotatable member is opposite to the rotational direction of the first rotatable member in a position where on an outer peripheral surface of the first rotatable member, the first rotatable member is closest to the second rotatable member; and a second magnet provided non-rotatably and stationarily inside the second rotatable member, wherein the second magnet includes a plurality of magnetic poles including a second developing pole provided opposed to the image bearing member in the second developing position, and a receiving pole provided upstream of the second developing pole and adjacent to the second developing pole with respect to the rotational direction of the second rotatable member and having a magnetic polarity different from that of the second developing pole and different from that of the delivering pole, the receiving pole being a magnetic pole, of the plurality of magnetic poles, provided closest to the delivering pole.

Further features of the present invention will become apparent from the following description of exemplary embodiments with reference to the attached drawings.

BRIEF DESCRIPTION OF THE DRAWINGS

FIG. 8 is a table showing a result of an experiment in which an occurrence status of an abnormal image in the first embodiment is checked.

FIG. 10 is a table showing a result of an experiment in which an occurrence status of an abnormal image in the second embodiment is checked.

FIG. 15 is a table showing a result of an experiment in which an occurrence status of an abnormal image in the fourth embodiment is checked.

FIG. 17 is a table showing a result of an experiment in which an occurrence status of an abnormal image in the fifth embodiment is checked.

DESCRIPTION OF THE EMBODIMENTS

First Embodiment

A first embodiment will be described using FIGS. 1 to 8. First, a general structure of an image forming apparatus in this embodiment will be described with reference to FIG. 1.

[Image Forming Apparatus]

Figure 1:
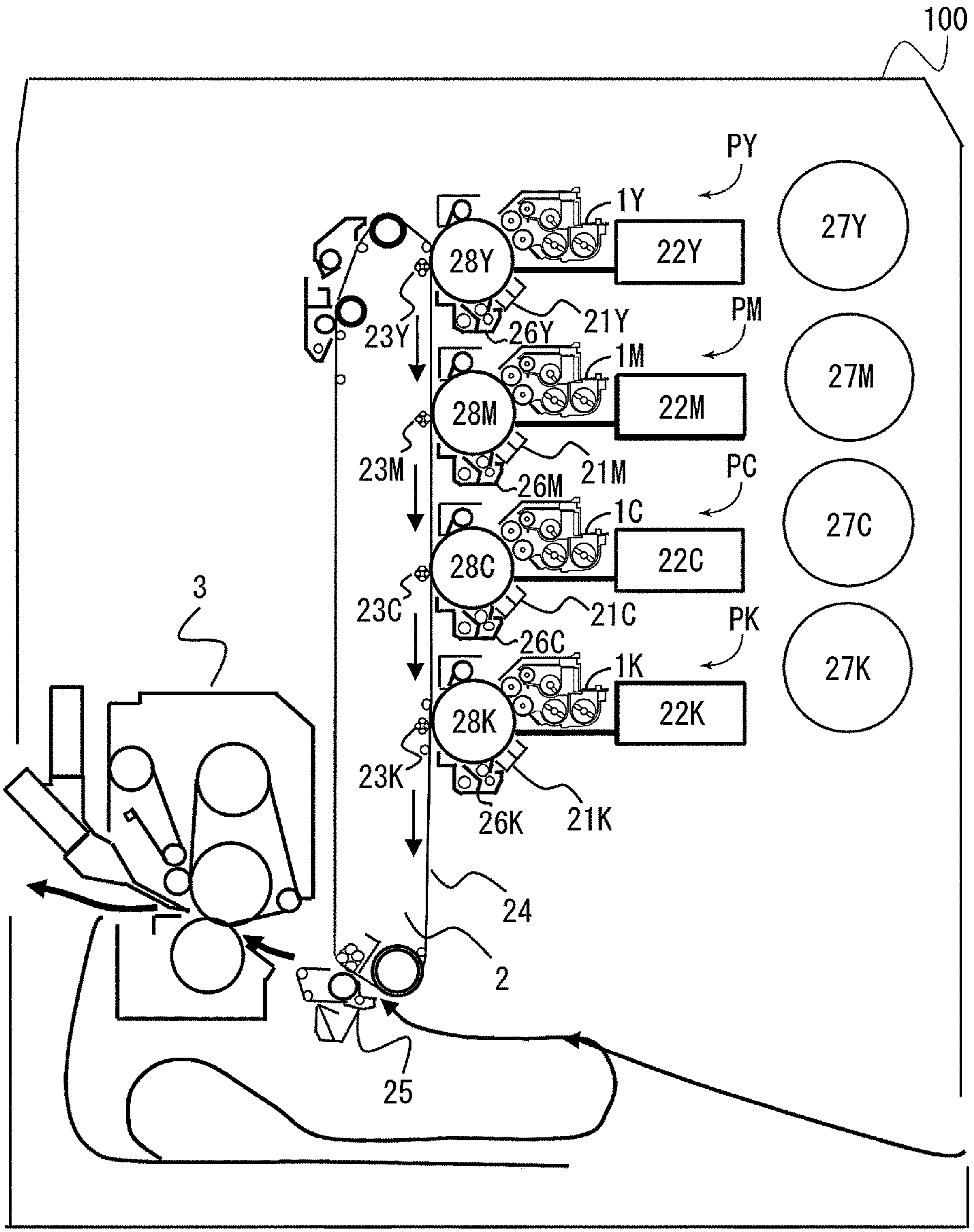
FIG. 1 is a schematic sectional view of an image forming apparatus in a first embodiment.

An image forming apparatus 100 is a full-color image forming apparatus, and in the case of this embodiment, the image forming apparatus 100 is, for example, an MFP (multi-function peripheral) having a copy function, a printer function, and a scan function. The image forming apparatus 100 includes, as shown in FIG. 1, image forming portions PY, PM, PC, and PK for performing an image forming step of forming toner images of four colors of yellow, magenta, cyan, and black, respectively, which are juxtaposed.

The image forming portions PY, PM, PC, and PK for the respective colors include primary chargers 21Y, 21M, 21C, and 21K, developing devices 1Y, 1M, 1C, and 1K, optical write portions (exposure devices) 22Y, 22M, 22C, and 22K, photosensitive drums 28Y, 28M, 28C, and 28K, and a cleaning devices 26Y, 26M, 26C, and 26K, respectively. Further, the image forming apparatus 100 includes a transfer device 2 and a fixing device 3. Incidentally, structures of the image forming portions PY, PM, PC, and PK are similar to each other, and therefore, in the following, description will be described using the image forming portion PY as a representative.

The photosensitive drum 28Y as an image bearing member is a photosensitive member, having a photosensitive layer formed of a resin such as polycarbonate, containing an organic photoconductor (OPC), and is constituted so as to be rotated at a predetermined speed. The primary charger 21Y includes a corona discharge pole disposed at a periphery of the photosensitive drum 28Y and electrically charges a surface of the photosensitive drum 28Y by generated ions.

In the optical write portion 22Y, a scanning optical device is assembled, and by exposing the charged photosensitive drum 28Y to light on the basis of image data, a potential of an exposed portion is lowered, so that a charge pattern (electrostatic latent image) corresponding to the image data is formed. The developing device 1Y develops the electrostatic latent image, formed on the photosensitive drum 28Y, by transferring a developer accommodated therein onto the photosensitive drum 28Y. The developer is prepared by mixing a carrier with toner of an associated color, and the electrostatic latent image is visualized (developed) with the toner.

The transfer device 2 includes primary transfer rollers 23Y, 23M, 23C, and 23K, an intermediary transfer belt 24, and a secondary transfer roller 25. The intermediary transfer belt 24 is wound around the primary transfer rollers 23Y, 23M, 23C, and 23K and a plurality of rollers, and is supported so as to be travelable.

The primary transfer rollers 23Y, 23M, 23C, and 23K are disposed in a named order from above in FIG. 1 and correspond to the colors of Y (yellow), M (magenta), C (cyan), and K (black), respectively. The secondary transfer roller 25 is disposed outside the intermediary transfer belt 24 and is constituted so that a recording material is capable of passing through between the secondary transfer roller 25 and the intermediary transfer belt 24. Incidentally, the recording material is a sheet such as paper or a plastic sheet.

The toner images of the respective colors formed on the photosensitive drums 28Y, 28M, 28C, and 28K are successively transferred onto the intermediary transfer belt 24 by the primary transfer rollers 23Y, 23M, 23C, and 23K, respectively, so that a color toner image including superimposed layers of the colors of yellow, magenta, cyan, and black. The thus-formed toner image is transferred by the secondary transfer roller 25 onto the recording material fed from a cassette in which recording materials are accommodated. The recording material on which the toner image is transferred is pressed and heated in the fixing device 3. By this, the toner on the recording material is melted, so that the color image is fixed on the recording material.

Developer storage portions 27Y, 27M, 27C, and 27K are provided correspondingly to the developing devices 1Y, 1M, 1C, and 1K, respectively, and in which bottles accommodating developers corresponding to the colors of yellow, magenta, cyan, and black are exchangeably mounted in a named order from above, respectively. The developer storage portions 27Y, 27M, 27C, and 27K are constituted so that the developers are capable of being fed (supplied) therefrom to the developing devices 1Y, 1M, 1C, and 1K corresponding to the colors of the developers stored therein, respectively.

For example, a toner weight ratio of the developer accommodated in each bottle is 80 to 95%, and a toner weight ratio of the developer in each of the developing devices 1Y, 1M, 1C, and 1K is 5 to 10%. For that reason, when the toner is consumed by development in each of the developing devices 1Y, 1M, 1C, and 1K, the developer containing the toner in an amount corresponding to a consumption amount of the toner is supplied, so that the toner weight ratio of the developer in each of the developing devices 1Y, 1M, 1C, and 1K is maintained in a constant amount.

[Developing Device]

Next, the developing devices 1Y, 1M, 1C, and 1K will be specifically described using FIGS. 2 to 5.

Figure 2:
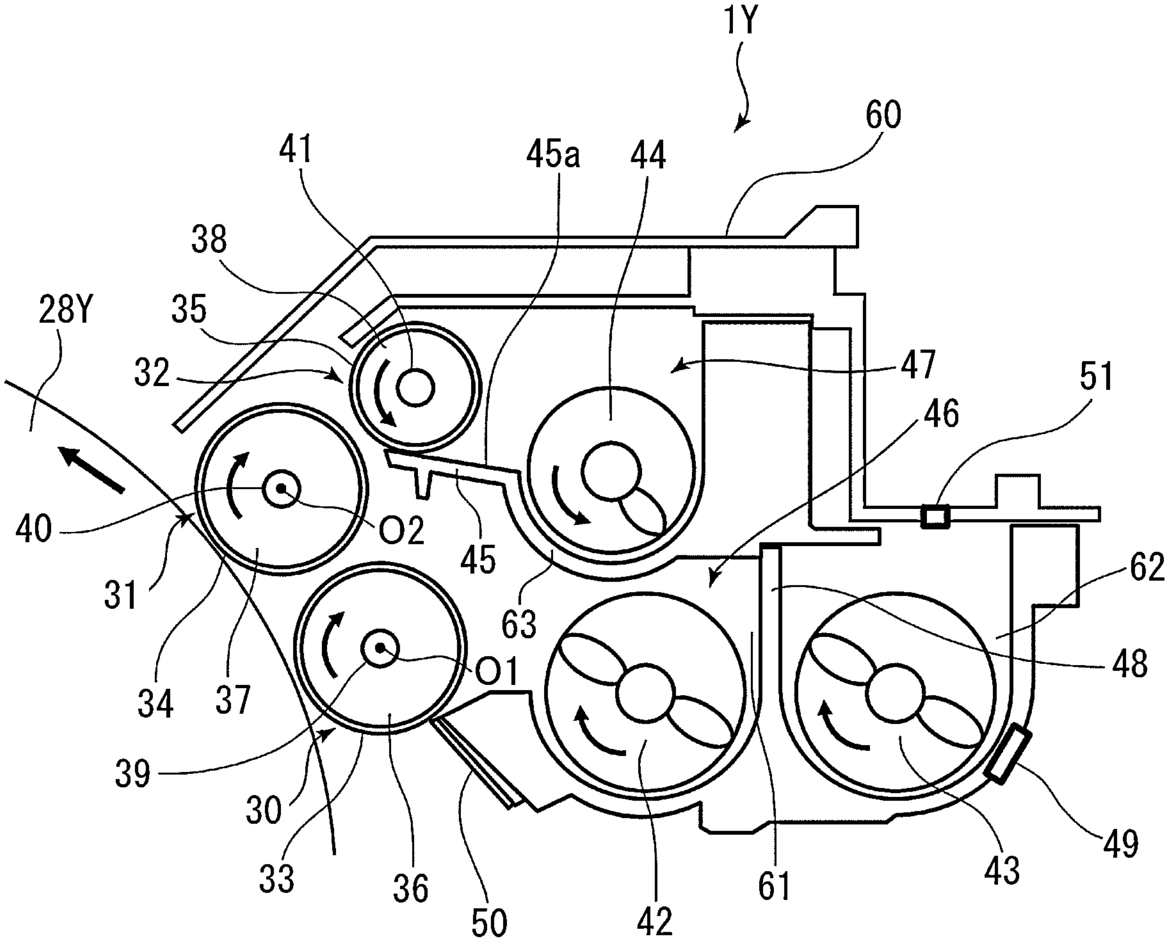
FIG. 2 is a schematic sectional view of a developing device according to the first embodiment.

Incidentally, structures of the developing devices 1Y, 1M, 1C, and 1K are the same, and therefore, in the following, the developing device 1Y will be described as a representative. FIG. 2 is a conceptual view illustrating the developing device 1Y shown in FIG. 1, and FIGS. 3 to 5 are conceptual views illustrating magnetic pole structures of a first magnet 36, a second magnet 37, and a third magnet 38 which are provided inside the developing device 1Y, respectively.

The developing device 1Y includes, as shown in FIG. 2, a first developing roller 30, a second developing roller 31, a peeling roller 32, a developer supplying screw 42, a developer stirring screw 43, and a developer collecting screw 44, and these members are accommodated in a developing container 60.

The first developing roller 30 is a developer carrying member which is rotationally driven, and is provided at a position adjacent to the photosensitive drum 28Y so that a rotational axis thereof is substantially parallel to a rotational axis of the photosensitive drum 28Y. The first developing roller 30 includes a first sleeve 33 which is rotatable, and the first magnet (fixed magnet) 36 non-rotationally provided inside the first sleeve 33 and for attracting the developer to a surface of the first sleeve 33 by a magnetic force. Then, the first developing roller 30 attracts (carries) the developer, scooped from the developer supplying screw 42, on the basis of the magnetic force, and develops the electrostatic latent image formed on the rotating photosensitive drum 28Y (image bearing member), with the developer.

The first sleeve 33 is a non-magnetic cylindrical member and is rotationally driven about a rotation shaft 39. A rotational direction of the first sleeve 33 is the clockwise direction as indicated by an arrow in FIG. 2 and is a direction opposite to a rotational direction of the photosensitive drum 28. For this reason, the first sleeve 33 and the photosensitive drum 28Y rotate in the same direction at mutually opposing positions. That is, normal (forward) development such that the photosensitive drum 28 is rotated from below toward above in a vertical direction in the position where the photosensitive drum 28 opposes the first sleeve 33 is performed.

Figure 3:
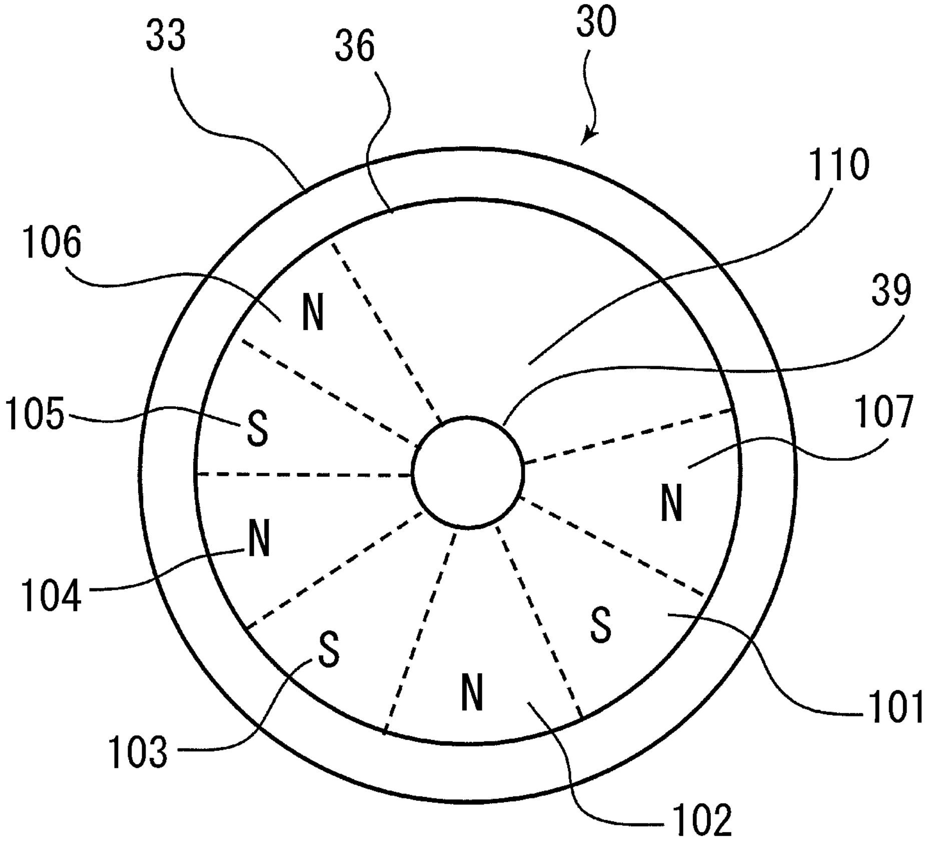
FIG. 3 is a schematic view showing a magnetic pole arrangement of a first developing roller in the first embodiment.

The first magnet 36 is disposed inside the first sleeve 33 and includes, as shown in FIG. 3, a plurality of sector magnetic poles 101 to 107. Between an inner periphery of the first sleeve 33 and an outer periphery of the first magnet 36, a space permitting rotation of the first sleeve 33 is provided.

The developer attracted onto the first sleeve 33 is conveyed toward the photosensitive drum 28Y by a rotation operation of the first sleeve 33, so that the electrostatic latent image formed on the photosensitive drum 28Y is developed with the developer. After the electrostatic latent image formed on the photosensitive drum 28Y is developed with the developer, the developer on the first sleeve 33 is conveyed to the neighborhood of the second developing roller 31 by the rotation operation of the first sleeve 33. Then, in the neighborhood of a closest position between the first developing roller 30 and the second developing roller 31, the developer is peeled off from the first sleeve 33 and then delivered to a surface of a second sleeve 34 by a magnetic field generated by the first magnet 36 included in the first developing roller 30 and by the second magnet 37 included in the second developing roller 31.

The second developing roller 31 is a developer carrying member which is rotationally driven and is provided downstream of the first developing roller 30 with respect to the rotational direction of the photosensitive drum 28Y, and a rotation center O2 of the second developing roller 31 is positioned above a rotation center O1 of the first developing roller 30 with respect to the vertical direction. To the second developing roller 31, the developer is delivered from the first developing roller 30 by the magnetic force (FIG. 2). In this embodiment, entirety of the second developing roller 31 is positioned above the rotation center O1 of the first developing roller 30.

The second developing roller 31 is, similarly as the first developing roller 30, provided at a position adjacent to the photosensitive drum 28Y so that a rotational axis thereof is substantially parallel to a rotational axis of the photosensitive drum 28Y. Accordingly, the second developing roller 31 and the first developing roller 30 are substantially parallel to each other in rotational axis.

Such a second developing roller 31 includes a second sleeve 34 which is rotatable, and the second magnet (fixed magnet) 37 non-rotationally provided inside the second sleeve 34 and for attracting the developer to a surface of the second sleeve 34 by a magnetic force. Then, on the basis of the magnetic force, to the second developing roller 31, the developer is delivered from the first developing roller 30 (the first sleeve 33), and the second developing roller 31 attracts (carries) the developer, and develops the electrostatic latent image formed on the rotating photosensitive drum 28Y, with the developer. Incidentally, on a side of the second developing roller 31, the peeling roller 32 described later is positioned.

The second sleeve 34 is a non-magnetic cylindrical member and is rotationally driven about a rotation shaft 40. A rotational direction of the second sleeve 34 is the clockwise direction as indicated by an arrow in FIG. 2 similarly as the first sleeve 33 and is a direction opposite to a rotational direction of the photosensitive drum 28 in this embodiment. For this reason, the second sleeve 34 and the photosensitive drum 28Y rotate in the same direction at mutually opposing positions. That is, normal development such that the photosensitive drum 28 is rotated from below toward above in the vertical direction in the position where the photosensitive drum 28 opposes the second sleeve 34 is performed. Further, the first sleeve 33 and the second sleeve 34 rotate in opposite directions at mutually opposing positions.

Figure 4:
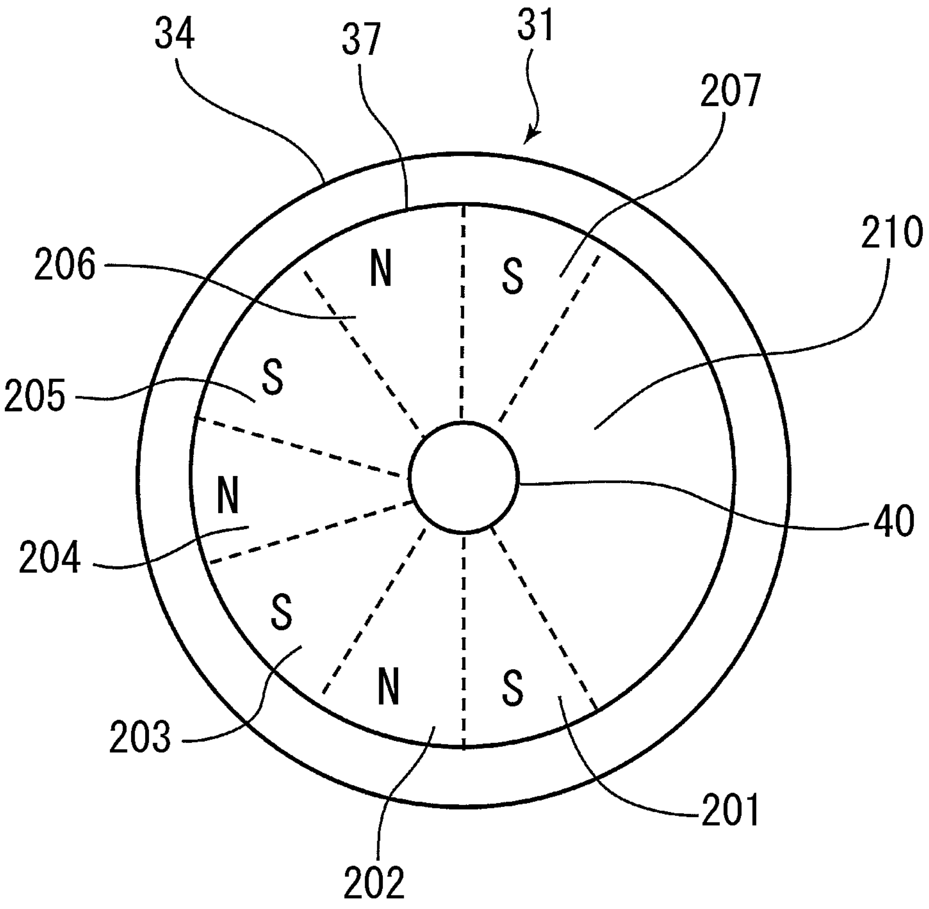
FIG. 4 is a schematic view showing a magnetic pole arrangement of a second developing roller in the first embodiment.

The second magnet 37 is disposed inside the second sleeve 34 and includes, as shown in FIG. 4, a plurality of sector magnetic poles 201 to 207. Between an inner periphery of the second sleeve 34 and an outer periphery of the second magnet 37, a space permitting rotation of the second sleeve 34 is provided.

The developer attracted onto the second sleeve 34 is conveyed toward the photosensitive drum 28Y by a rotation operation of the second sleeve 34, so that the electrostatic latent image formed on the photosensitive drum 28Y is developed with the developer. After the electrostatic latent image formed on the photosensitive drum 28Y is developed with the developer, the developer remaining on the second sleeve 34 is conveyed to the neighborhood of the peeling roller 32 by the rotation operation of the second sleeve 34. Then, in the neighborhood of a closest position between the second developing roller 31 and the peeling roller 32, the developer is delivered from the second sleeve 34 to a third sleeve 35 of the peeling roller 32 by a magnetic field generated by the second magnet 37 included in the second developing roller 31 and by the third magnet 38 included in the peeling roller 32.

The peeling roller 32 as a peeling portion is provided on a side opposite from the photosensitive drum 28Y with respect to a rotation center of the second sleeve 34 and peels off, from the second developing roller 31, the developer after the electrostatic latent image on the photosensitive drum 28Y is developed by the second developing roller 31. Specifically, the peeling roller 32 is a developer carrying member which is rotationally driven, and is provided between the second developing roller 31 and the developer collecting screw 44 so that a rotation center thereof is positioned above the rotation center R2 of the second developing roller 31.

Further, the peeling roller 32 is disposed so that a rotational axis thereof is substantially parallel to a rotational axis of the second developing roller 31. Such a peeling roller 32 includes a third sleeve 35 which is rotatable, and the third magnet (fixed magnet) 38 non-rotationally provided inside the third sleeve 35 and for attracting the developer to a surface of the third sleeve 35 by a magnetic force, and is constituted so that the developer is delivered from the second developing roller 31 thereto on the basis of the magnetic force.

The third sleeve 35 is a non-magnetic cylindrical member and is rotationally driven about a rotation shaft 41. A rotational direction of the third sleeve 35 is the counterclockwise direction as indicated by an arrow in FIG. 2 and is a direction opposite to a rotational direction of the second sleeve 34. For this reason, the third sleeve 35 and the second sleeve 34 rotate in the same direction at mutually opposing positions.

Figure 5:
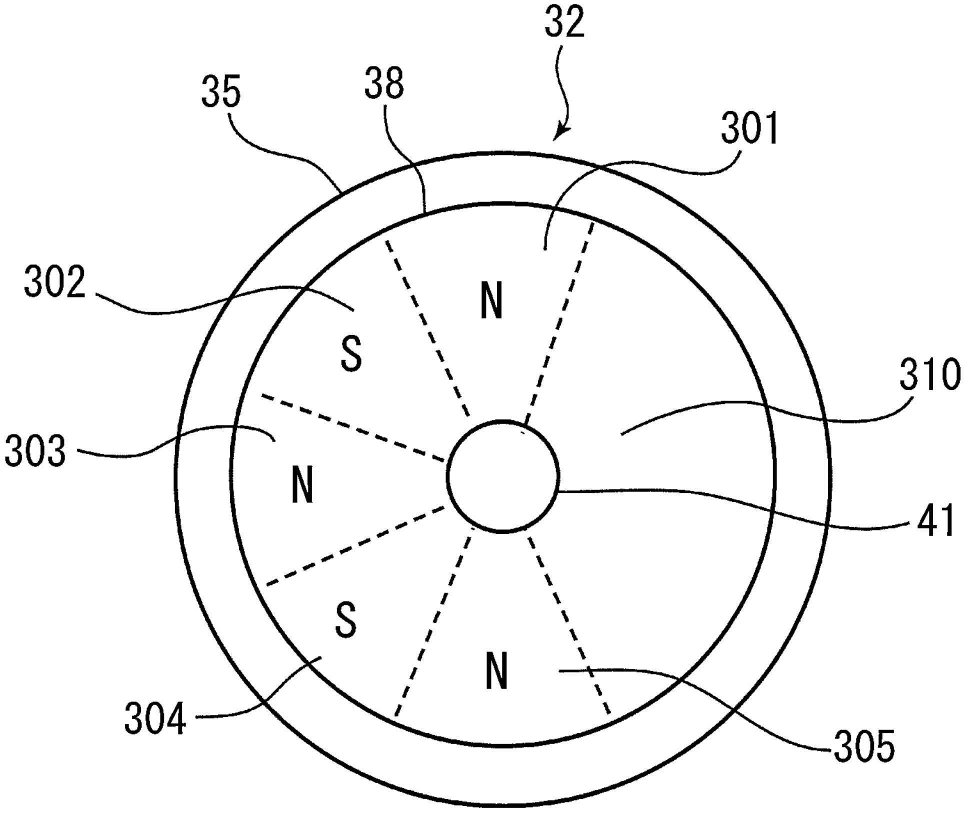
FIG. 5 is a schematic view showing a magnetic pole arrangement of a peeling roller in the first embodiment.

The third magnet 38 is disposed inside the third sleeve 35 and includes, as shown in FIG. 5, a plurality of sector magnetic poles 301 to 305. Between an inner periphery of the third sleeve 35 and an outer periphery of the third magnet 38, a space permitting rotation of the third sleeve 35 is provided.

The developer attracted to the third sleeve 35 is conveyed to a downstream side of the rotational direction by a rotation operation of the third sleeve 35 is peeled off from the third sleeve 35 at a position close to the developer collecting screw 44 by the third magnet 38 included in the peeling roller 32, so that the developer is dropped toward a guiding member 45 positioned below with respect to the vertical direction, by a self-weight thereof. Then, the developer dropped on the guiding member 45 is guided toward the developer collecting screw 44 by its own weight.

The guiding member 45 and the developer collecting screw 44 constitute a developer collecting portion 47 as a collecting portion for collecting the developer peeled off from the third sleeve 35 on the peeling roller 32. In the developer collecting portion 47, the developer collecting screw 44 is disposed so that a rotation center thereof is positioned below a rotation center of the peeling roller 32 in the vertical direction, and conveys the developer delivered (collected) from the peeling roller 32, while stirring the developer.

The guiding member 45 as a guiding portion is disposed below the peeling roller 32 with respect to the vertical direction, and guides the developer, peeled off by the peeling roller 32, toward the developer collecting screw 44. Such a guiding member 45 is provided with an inclined surface 45*a* along which the developer slides down by its own weight in order to reliably guide the peeled developer toward the developer collecting screw 44. The inclined surface 45*a* is inclined with respect to a horizontal direction so that a position thereof on the developer collecting screw 44 side is lower than a lower position of the peeling roller 32.

The developer collecting screw 44 as a collecting member and a conveying (feeding) portion conveys the collected developer to a developer circulating portion 46 described below. That is, the developer collecting screw 44 is a screw conveying (feeding) member used for conveying the developer, collected by being slide down along the inclined surface 45*a* of the guiding member 45, in one direction while stirring the developer.

The developer circulating portion 46 is a supplying portion for supplying the developer to the first developing roller 30, and the developer circulating portion 46 includes a regulating member 50, the developer supplying screw 42, and the developer stirring screw 43. In the developer circulating portion 46, the developer is supplied to the first developing roller 30 while the developer is conveyed in the substantially horizontal direction while being stirred in the developer supplying screw 42 and the developer stirring screw 43. Further, as described above, the developer collected by the developer collecting portion 47 is dropped by its own weight and is guided to the developer circulating portion 46.

The developer supplying screw 42, the developer stirring screw 43, and the developer collecting screw 44 are screw conveying members for conveying the developer in one direction while stirring the developer, and the developer supplying screw 42 and the developer stirring screw 43 are positioned below the developer collecting screw 44 with respect to the vertical direction. Further, the developer supplying screw 42, the developer stirring screw 43, and the developer collecting screw 44 are disposed so that their rotational axes are substantially parallel to each other. The rotational axes of these screws are also substantially parallel to the rotational axis of the first developing roller 30.

The developer supplying screw 42 is positioned between the first developing roller 30 and the developer stirring screw 43, and between itself and the developer stirring screw 43, a partition wall 48 of the developing container 60 is provided. The partition wall 48 of the developing container 60 is extended along rotational axis directions of the developer supplying screw 42 and the developer stirring screw 43. The partition wall 48 is provided with a communication opening (not shown) for establishing communication between a first feeding path 61 along which the developer is fed by the developer supplying screw 42 and a second feeding path 62 along which the developer is fed by the developer stirring screw 43 is provided.

The developer stirred by the developer collecting screw 44 passes through a communication opening (not shown) formed in a partition wall 63 of the developing container 60 positioned between the developer collecting screw 44 and the developer supplying screw 42 and then is dropped toward the developer supplying screw 42 by its own weight. The above-described guiding member 45 is formed integrally with the partition wall 63, and above the partition wall 63, the developer collecting screw 44 is disposed.

A position of the communication opening through which the developer stirred by the developer collecting screw 44 is dropped by its own weight and is guided into the developer circulating portion 46 may preferably be disposed while avoiding a region (an intermediary portion with respect to the rotational axis direction of the developer supplying screw 42) in which the developer is supplied toward the first developing roller 30. In this embodiment, the position of the communication opening is a position where the communication opening position is included in a range of a downstream end portion (terminal portion) with respect to a developer feeding direction of the first feeding path 61 in which the developer supplying screw 42 is disposed.

Developer feeding directions of the developer supplying screw 42 and the developer stirring screw 43 are mutually opposite directions. Further, a starting end side (upstream end side in the developer feeding direction) and a terminal end side (downstream end side in the developer feeding direction) of the first feeding path 61 in which the developer supplying screw 42 is disposed, and a terminal end side and a starting end side of the second feeding path 62 in which the developer stirring screw 43 is disposed communicate with each other, respectively, via communication openings provided in the partition wall 48. Accordingly, the developer is circulated in the rotational directions of the developer supplying screw 42 and the developer stirring screw 43 indicated by arrows in FIG. 2 and in the substantially horizontal direction in the developing container 60, so that a part of the developer is supplied toward the first developing roller 30.

A developer supply opening 51 (see FIG. 2) is provided above the developer stirring screw 43 in the developing container 60 and is connected to the developer storage portion 27Y (see FIG. 1). Further, the developer supply opening 51 is constituted so as to be capable of supplying the developer, accommodated in a bottle mounted in the developer storage portion 27Y, to the second feeding path 62 in which the developer stirring screw 43 is disposed.

As described above, a toner weight ratio of the developer accommodated in the bottle of the developer storage portion 27Y is larger than a toner weight ratio of the developer in the developing device 1Y, and therefore, by adjusting an amount of the developer supplied to the developer stirring screw 43, the toner weight ratio of the developer in the developing device 1Y can be maintained at a certain level.

A toner concentration detecting sensor 49 (see FIG. 2) is provided for detecting a toner concentration of the developer contained in the developer circulating portion 46. The toner concentration detecting sensor 49 is a sensor for detecting (magnetic) permeability. The toner concentration corresponds to a consumption amount of the toner in the developing device 1Y, and therefore, is utilized in control of supply of the developer from the developer storage portion 27Y. For example, when the toner concentration is detected that the toner concentration is lowered than a predetermined value, the developer is supplied from the developer storage portion 27Y. Incidentally, the permeability changes depending on the toner concentration, and therefore, by utilizing the permeability, it is possible to detect the toner concentration.

The regulating member 50 is disposed adjacent to the first developing roller 30 and is used for regulating an amount of the developer supplied from the developer circulating portion 46 to the first developing roller 30. The regulating member 50 can be constituted so as to regulate an amount of the developer attracted to the first developing roller 30, on the basis of a gap between the surface of the first sleeve 33 of the first developing roller 30 and an end portion of the regulating member 50.

A circulating path of the developer in the developing container 60 is such that the developer is fed in the substantially horizontal direction while being stirred in the developer circulating portion 46 and thereafter is supplied to the first developing roller 30, and then is delivered from the first developing roller 30 to the second developing roller 31 positioned above the first developing roller 30, on the basis of the magnetic force. Then, the developer is delivered from the second developing roller 31 to the peeling roller 32 positioned beside the second developing roller 31, on the basis of the magnetic force again, and thereafter, is peeled off from the peeling roller 32 by the third magnet 38 included in the peeling roller 32. Further, the developer is collected by the developer collecting portion 47 and then is guided again into the developer circulating portion 46.

Further, as described above, in this embodiment, a two-component development type is used as a development type, and as the developer, a developer obtained by mixing non-magnetic toner having a negative charging property with a carrier having a magnetic property is used. The non-magnetic toner is toner obtained by containing a colorant, a wax component, and the like in a resin such as polyester or styrene-acrylic resin, by forming the mixture in powder through pulverization or polymerization, and then by adding fine powder of titanium oxide, silica, or the like to a surface the powder. The magnetic carrier is a carrier obtained by coating a resin material on a surface layer of a core comprising ferrite particles or resin particles obtained by kneading with magnetic powder. The toner concentration in the developer (a weight ratio of the toner to the developer) in an initial state is 8% in this embodiment.

In general, the two-component development type using the toner and the carrier has a feature such that stress exerted on the toner is less than stress exerted on the toner in a one-component development type using a one-component developer because the toner and the carrier are charged to predetermined polarities by subjecting the toner and the carrier to triboelectric contact. On the other hand, by long-term use, an amount of a contaminant (spent) deposited on the carrier surface increases, and therefore, toner charging capacity gradually lowers. As a result, problems of a fog and a toner scattering arise. Although it would be considered that an amount of the carrier accommodated in the developing device is increased in order to prolong a lifetime of the two-component developing device, this causes upsizing of the developing device, and therefore is not desirable.

In order to solve the above-described problems on the two-component developer, in this embodiment, an ACR (auto carrier refresh) type is employed. The ACR type is a type such that an increase in amount of a deteriorated developer is suppressed by not only supplying a fresh developer little by little from the developer storage portion 27Y into the developing device 1Y but also discharging the developer, deteriorated in charging performance, little by little through a discharge opening (not shown) of the developing device 1Y. By this, the deteriorated carrier in the developing device 1Y is replaced little of little with a fresh carrier, so that the charging performance of the carrier in the developing device 1Y can be maintained at an approximately constant level.

[Magnetic Poles of Magnets]

Next, magnetic pole constitutions of the first magnet 36, the second magnet 37, and the third magnet 38 included in the first developing roller 30, the second developing roller 31, and the peeling roller 32, respectively, which are shown in FIGS. 3, 4, and 5, respectively, will be described.

As shown in FIG. 3, the first magnet 36 included in the first developing roller 30 has a 7-pole-based magnetic pole constitution including a plurality of magnetic poles 101, 102, 103, 104, 105, 106, and 107. Of these magnetic poles, the magnetic pole 106 is a delivering pole for delivering the developer from the first developing roller 30 to the second developing roller 31. The magnetic poles 101 to 107 are disposed in a named order in the rotational direction of the first sleeve 33. The magnetic pole 101 is an S pole and is disposed in a position opposing the regulating member 50 through the first sleeve 33, and adjusts an amount of the developer conveyed on the first sleeve 33 as described above. The magnetic pole 104 as a first developing pole is an N pole and is disposed in a position opposing the photosensitive drum 28Y through the first sleeve 33, and is a magnetic pole for developing the electrostatic latent image, formed on the photosensitive drum 28Y, with the developer. Hereinafter, the magnetic pole 104 is referred to as the first developing pole 104 in some cases.

The magnetic pole 106 as a delivering pole is the N pole and is a magnetic pole for delivering the developer from the first sleeve 33 to the second sleeve 34 by a magnetic field generated in cooperation with the second magnet 37 of the second developing roller 31, and the magnetic pole 106 is hereinafter referred to as a delivering pole 106 in some cases.

The magnetic pole 107 is the N pole and is used for attracting the developer, supplied from the developer supplying screw 42, to the first sleeve 33. The magnetic poles 102, 103, and 105 are the N pole, the S pole, and the S pole, respectively, and are used as feeding poles for feeding upward the developer attracted by the magnetic pole 107 with rotation of the first sleeve 33. Of these magnetic poles, the magnetic pole 105 is a first magnetic pole upstream of and adjacent to the delivering pole 106 with respect to the rotational direction of the first sleeve 33, and the magnetic pole 105 is hereinafter referred to as a first feeding pole 105 in some cases. The first developing pole 104 is positioned upstream of and adjacent to the first feeding pole 105 with respect to the rotational direction of the first sleeve 33.

Further, the magnetic pole 107 is disposed on a side downstream of the delivering pole 106 with respect to the rotational direction of the first sleeve 33 and has the same polarity as the delivering pole 106. The delivering pole 106 and the magnetic pole 107 form a low-magnetic force portion 110 lower in magnetic force than the delivering pole 106 by a repelling magnetic field therebetween in cooperation with each other. By this low-magnetic force portion 110, the developer is peeled off from on the first sleeve 33, and delivery of the developer from the first sleeve 33 to the second sleeve 34 is promoted. Incidentally, the low-magnetic force portion 110 may have substantially no magnetic force in this embodiment, but may have a low magnetic force, and for example, may be a magnetic pole of 5 mT or less in magnetic force (normal component Br of magnetic flux density). The same applies to a low-magnetic force portion 210 of the second magnet 37 shown in FIG. 4 and a low-magnetic force portion 310 of the third magnet 38 shown in FIG. 5.

As shown in FIG. 4, the second magnet 37 included in the second developing roller 31 has a seven-magnetic pole-based constitution including a plurality of magnetic poles 201, 202, 203, 204, 205, 206 and 207. Of these, the magnetic pole 201 is a receiving pole for receiving the developer from the first developing roller 30 by the second developing roller 31. The magnetic poles 201 to 207 are disposed in a named order in the rotational direction of the second sleeve 34.

The magnetic pole 201 as the receiving pole is a magnetic pole for attracting the developer from the first sleeve 33 to the second sleeve 34 by a magnetic field generated in cooperation with the magnetic pole 106 of the first magnet 36 of the first developing roller 30, and hereinafter, the magnetic pole 201 is referred to as a receiving pole 201 in some cases. The magnetic pole 207 is a magnetic pole for delivering the developer from the second sleeve 34 to the third sleeve 35 by a magnetic field generated in cooperation with the third magnet 38 of the peeling roller 32.

Further, the magnetic pole 201 is the S pole different in polarity from the developing pole 106 and is used for attracting the developer from the first developing roller 30 (first sleeve 33) to the second sleeve 34 as described above. The magnetic pole 203 as a second delivering pole is the S pole and is a magnetic pole which is disposed in a position opposing the photosensitive drum 28Y through the second sleeve 34 and which is for developing the electrostatic latent image formed on the photosensitive drum 28Y. Hereinafter, the magnetic pole 203 is referred to as a second developing pole 203 in some cases.

The magnetic poles 202, 204, 205 and 206 are the N pole, the N pole, the S pole, and the N pole, and are used for feeding upward the developer attracted by the magnetic pole 201 with rotation of the second sleeve 34. Of these magnetic poles, the magnetic pole 202 is a second magnetic pole positioned downstream of and adjacent to the receiving pole 201 with respect to the rotational direction of the second sleeve 34, and the magnetic pole 202 is hereinafter referred to as a second feeding pole 202 in some cases. The second developing pole 203 is positioned downstream of and adjacent to the second feeding pole 202 with respect to the rotational direction of the second sleeve 34.

The magnetic pole 207 is the S pole and delivers the developer, after passing through a developing region with the photosensitive drum 28Y corresponding to the magnetic pole 203, from the second sleeve 34 to the third sleeve 35 opposing the second sleeve 34 by a magnetic field generated in cooperation with a magnetic pole 303 in the third magnet 38 included in the peeling roller 32.

Further, the magnetic pole 207 is disposed on a side upstream of the receiving pole 201 with respect to the rotational direction of the second sleeve 34 and has the same polarity as the receiving pole 201. The receiving pole 201 and the magnetic pole 207 form the low-magnetic force portion 210 lower in magnetic force than the magnetic pole 207 by a repelling magnetic field generated in cooperation with each other. By this low-magnetic force portion 210, the developer is peeled off from on the second sleeve 34, and delivery of the developer from the first sleeve 33 to the second sleeve 34 is promoted. Further, by the low-magnetic force portion 210, it is possible to prevent attraction of the developer to a closest portion between the first sleeve 33 and the second sleeve 34, and pressure exerted on the developer can be suppressed.

As shown in FIG. 5, the third magnet 38 included in the peeling roller 32 is provided with a plurality of magnetic poles 301, 302, 303, 304, and 305. The magnetic poles 301 to 305 are disposed in a named order in the rotational direction of the third sleeve 35.

The magnetic pole 303 is the N pole different polarity from the magnetic pole 207 and is used for attracting the developer, peeled off from the second sleeve 34 as described above, to the third sleeve 35. The magnetic poles 301, 302, and 304 are the N pole, the S pole, and the S pole are used for feeding the developer on the third sleeve 35 with rotation of the third sleeve 35.Particularly, the magnetic pole 304 is used for feeding downward the developer attracted by the magnetic pole 303 with rotation of the third sleeve 35. The magnetic pole 305 is the N pole and is peeling pole used for peeling off the developer, attracted to the third sleeve 35, from the third sleeve 35 by a repelling magnetic field generated in cooperation with the magnetic pole 301 having the same polarity as the magnetic pole 305.

[Magnetic Pole Arrangement Relationship]]

Figure 6:
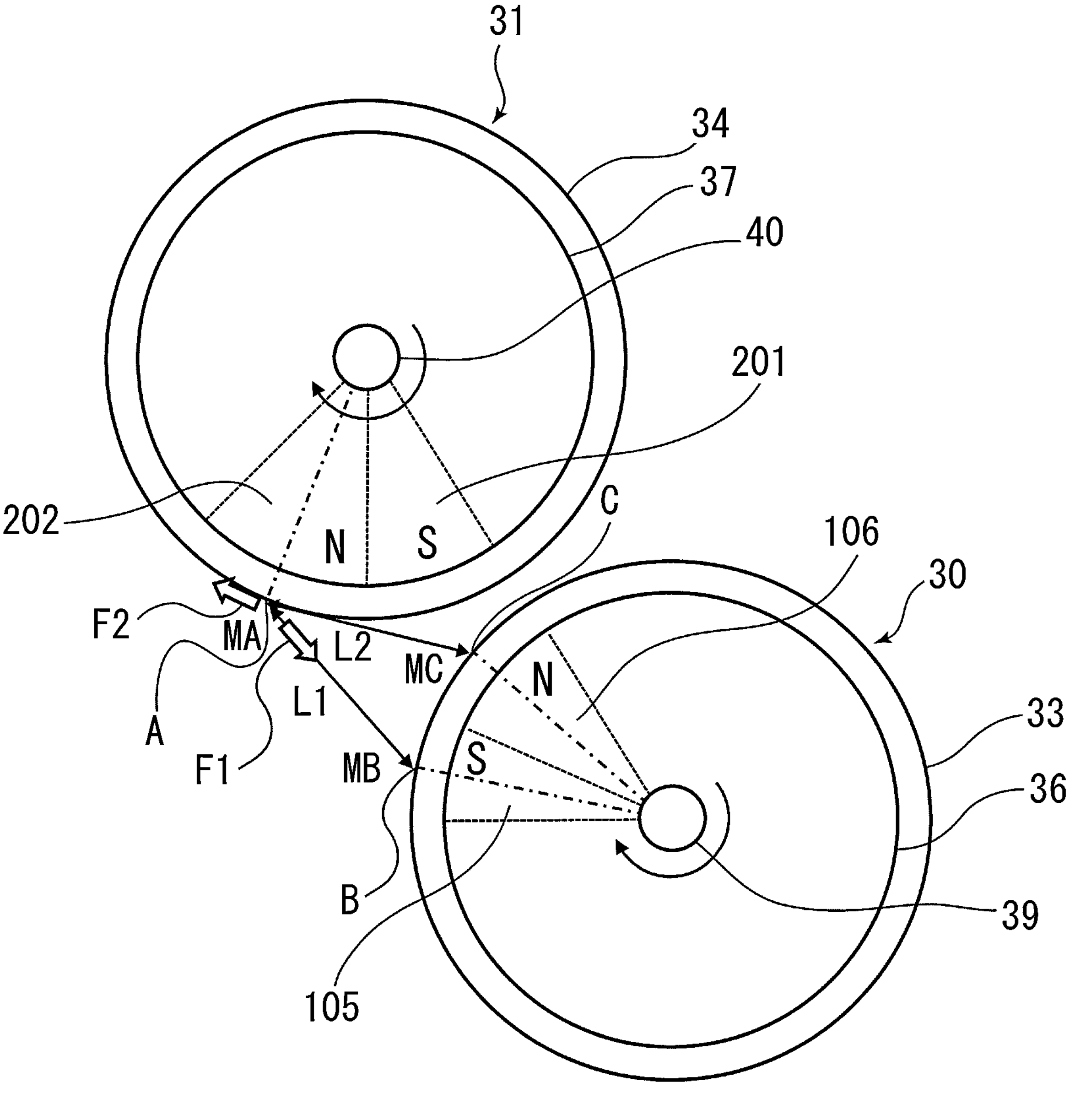
FIG. 6 is a schematic view showing a relationship of a magnetic pole arrangement between the first developing roller and the second developing roller in the first embodiment, in which a relationship between an attracting force F1 and a repelling force F2 is shown.

Next, a magnetic pole arrangement relationship between the first magnet 36 and the second magnet 37 disposed inside the first developing roller 30 and the second developing roller 31, respectively, will be described using FIG. 6. FIG. 6 is a conceptual view for illustrating an arrangement of the first developing roller 30 and the second developing roller 31 in this embodiment, and particularly shows a layout of the first feeding pole 105 and the delivering pole 106 of the first magnet 36 of the first developing roller 30, and the receiving pole 201 and the second feeding pole 202 of the second magnet 37 of the second developing roller 31. Incidentally, due to complication, a part of the magnetic poles are omitted from display.

In this embodiment, as described above, the developer in the developing device 1Y is moved from the surface of the first sleeve 33 of the first developing roller 30 to the surface of the second sleeve 34 of the second developing roller 31 by magnetic fields of the delivering pole 106 in the first developing roller 30 and the receiving pole 201 in the second developing roller 31, and then is moved onto the surface of the third sleeve 35 of the peeling roller 32 after being used in a developing step of the electrostatic latent image on the photosensitive drum 28Y.

Here, the first feeding pole 105 in the first developing roller 30 and the second feeding pole 202 in the second developing roller 31 have a magnetic characteristic of an S pole and an N pole shown in FIGS. 3 and 4, respectively. For this reason, an attracting force (F1) for delivering the developer is generated also between the first feeding pole 105 and the second feeding pole 202. Then, by the attracting force F1 between the first feeding pole 105 and the second feeding pole 202, delivery of the developer is caused between the first feeding pole 105 and the second feeding pole 202. When the delivery of the developer is made between the first feeding pole 105 and the second feeding pole 202, the developer contacts also the photosensitive drum 28Y, so that an abnormal image in a vertical stripe shape is generated on the photosensitive drum 28Y.

On the other hand, the delivering pole 106 in the first developing roller 30 and the second feeding pole 202 in the second developing roller 31 are the N pole (same pole) as shown in FIGS. 3 and 4, and therefore, between the delivering pole 106 in the first developing roller 30 and the second feeding pole 202 in the second developing roller 31, a repelling force (F2) for pressing the developer toward the sleeve side is generated.

Next, suppression of the delivery of the developer between the first feeding pole 105 in the first developing roller 30 and the second feeding pole 202 in the second developing roller 31 will be specifically described. Chain lines shown in FIG. 6 and FIG. 7 described indicate a position (peak position) of a maximum of a magnetic flux density in the second feeding pole 202 of the second magnet 37 in a normal direction of the second sleeve 34 and indicate positions (peak positions) of maximums of magnetic flux densities in the first feeding pole 105 and the delivering pole 106 of the first magnet 36 in a normal direction of the first sleeve 33. First, an absolute value of a maximum of a magnetic flux density normal component of the second feeding pole 202 in the second developing roller 31 is MA [mT], and a position of this maximum on the second sleeve 34 is a point A. Further, an absolute value of a maximum of a magnetic flux density normal component of the first feeding pole 105 in the first developing roller 30 is MB [mT], and a position of this maximum on the first sleeve 33 is a point B. In addition, an absolute value of a maximum of a magnetic flux density normal component of the delivering pole 106 in the first developing roller 30 is MC [mT], and a position of this maximum on the first sleeve 33 is a point C. Further, a rectilinear line distance between the points A and B is L1, and a rectilinear line distance between the points A and C is L2.

Further, the above-described attracting force F1 is a magnetic force acting on the developer, with respect to a rectilinear line AB direction connecting the points A and B, between the second feeding pole 202 on the second sleeve 34 and the first feeding pole 105 on the first sleeve 33. Further, the above-described repelling force F2 is a magnetic force acting on the developer, with respect to a rectilinear line AC direction connecting the points A and C, between the second feeding pole 202 on the second sleeve 34 and the delivering pole 106 on the first sleeve 33.

Such attracting force F1 and repelling force F2 can be expressed by the following formulas 1 and 2, respectively. Incidentally, k is coefficient set by (magnetic) permeability, a radius, or the like of the magnetic carrier of the developer.

$$F1 = k \times MA \times MB / L1^2 \quad \text{(formula 1)}$$

$$F2 = k \times MA \times MC / L2^2 \quad \text{(formula 2)}$$

In the second feeding pole 202 in the second developing roller 31, in order to suppress the delivery of the developer between the second feeding pole 202 in the second developing roller 31 and the first feeding pole 105 in the first developing roller 30, it may only be required that the attracting force F1 from the second feeding pole 202 in the second developing roller 31 toward the first feeding pole 105 in the first developing roller 30 is not more than the repelling force F2 based on the delivering pole 106 in the first developing roller 30 and the second feeding pole 202 in the second developing roller 31. That is, for the above-described formulas 1 and 2, the following relationship may only be required to satisfy the following relationship:

$$F1 \leq F2. \quad \text{(formula 3)}$$

That is, in this embodiment, the magnetic flux density and an arrangement of the delivering pole 106, the first feeding pole 105, and the second feeding pole 202 are set so as to satisfy the formula 3. Specifically, positions of the above-described MA, MB, and MC and the points A, B, and C are set so as to satisfy the formula 3.

Figure 7:
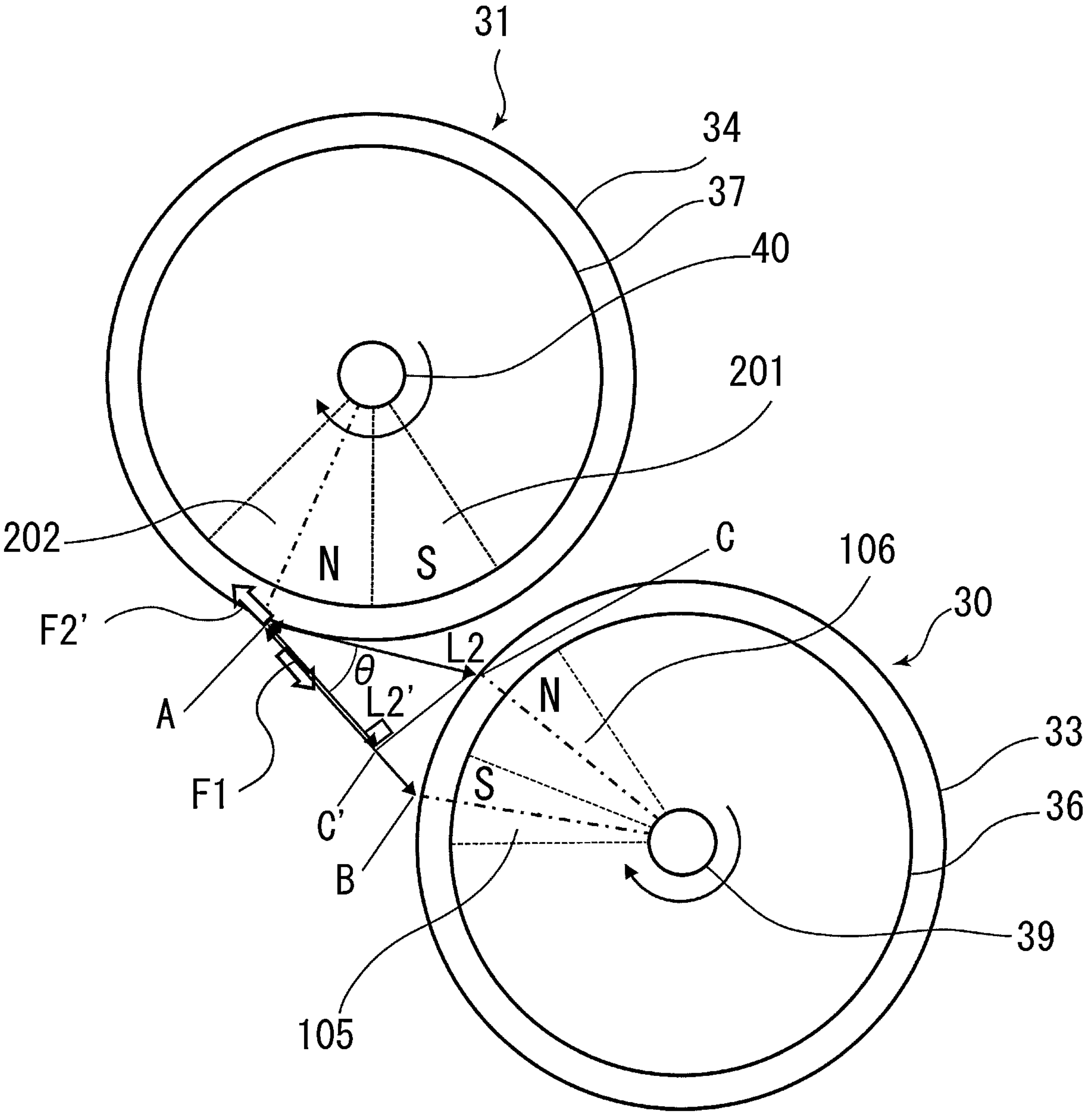
FIG. 7 is a schematic view showing a relationship of a magnetic pole arrangement between the first developing roller and the second developing roller in the first embodiment, in which a relationship between the attracting force F1 and a repelling force F2' is shown.

Further, in FIG. 7, a relationship between a force component F2' of the repelling force F2 in the rectilinear line AB direction and the above-described attracting force F1 is shown. When an angle formed by the rectilinear lines AB and AC is θ, a point on the rectilinear line AB when a perpendicular line is drawn from the point C onto the rectilinear line AB is C', and a rectilinear line distance between the points A and C' is L2', L2' can be expressed by the following formula 4:

$$L2' = L2 \times \cos\theta. \quad \text{(formula 4)}$$

In the second feeding pole 202 in the second developing roller 31, in order to cancel the attracting force F1 received from the first feeding pole 105 in the first developing roller 30, it is desirable that a repelling force F2' in a rectilinear line AC' direction between the second feeding pole 202 in the second developing roller 31 and the delivering pole 106 in the first developing roller 30 is the attracting force F1 or more. F2' is a force component of F2 in the rectilinear line AB direction and can be expressed by the following formula 5:

$$F2' = F2 \times \cos\theta. \quad \text{(formula 5)}$$

Further, in order to cancel the attracting force F1 by the repelling force F2', the following relationship may desirably hold:

$$F1 \leq F2'. \quad \text{(formula 6)}$$

That is, in this embodiment, it is preferable that the formula 6 is further satisfied, and it is preferable that the magnetic flux density and the arrangement of the delivering pole 106, the first feeding pole 105, and the second feeding pole 202 are set so as to satisfy the formula 6. Specifically, the positions of the above-described MA, MB, and MC and the points A, B and C are set so as to satisfy the formula 6.

Experiment

Next, an experiment in which an occurrence status of a stripe-shaped fog image (abnormal image) in the above-described constitution was checked will be described.

In the example, the magnetic flux density MA of the second feeding pole 202 in the second developing roller 31, the magnetic flux density MB of the first feeding pole 105 in the first developing roller 30, and the magnetic flux density MC of the delivering pole 106 in the first developing roller 30 were changed from a condition REF, and images were outputted by image forming apparatuses in which delivering poles in various conditions REF and STUDY1 to STUDY5 are incorporated. Then, the occurrence status of the stripe-shaped fog image on the output image was checked.

Incidentally, in the experiment, the position of each of the point A where the magnetic flux density on the second feeding pole 202 in the second developing roller 31 becomes maximum, the point B where the magnetic flux density on the first feeding pole 105 in the first developing roller 30 becomes maximum, and the point C where the magnetic flux density on the delivering pole 106 in the first developing roller 30 becomes maximum was not changed. That is, L1 and L2 are fixed. Further, the angle θ formed by the rectilinear lines AB and AC was set to 36°.

In the example, the occurrence status of the stripe-shaped fog image on the output image was evaluated in the following manner.

Solid white images were formed on 10 A3-sized sheets, and the number of vertical stripes on the output image was measured.

In the case where there was no vertical stripe on the solid white images on the 10 A3-sized sheets, the solid white images were formed on 100 A3-sized sheets and then the vertical stripes were checked.

A result of this experiment was shown in a table of FIG. 8.

Symbols in each of rows of the abnormal image in FIG. 8 results of evaluation of the occurrence status of the stripe-shaped fog image (abnormal image), and contents thereof are as follows.

x: On a single A3-sized sheet, 10 or more vertical) stripes were recognized.

Δ: On the single A3-sized sheet, about one vertical stripe was recognized.

○: On 10 A3-sized sheets, about one vertical stripe was recognized.

◎: On 100 A3-sized sheets, about one vertical stripe was recognized.

In the develop evaluation, "○" and "◎" show a level such that the abnormal image does not substantially occur practically.

As shown in FIG. 8, in the experiment, for each condition, the magnetic flux density MB of the first feeding pole 105 in the first developing roller 30 was changed in the STUDY 1 to the STUDY 3. As is apparent from FIG. 8, by decreasing MB, the vertical stripe-shaped fog image did not readily occur. In the STUDY 2, when the respective values are applied to the formulas 1 and 2, conditions each satisfying F1≤F2 of the formula 3 are obtained, so that evaluation of the occurrence status of the vertical stripe-shaped fog image of the output image became the "○" level. Similarly, in the STUDY 3, when the respective values are applied to the formulas 1 and 2 and then to the formula 5, a condition satisfying F1≤F2' of the formula 6 is obtained, so that it was able to be confirmed that the vertical stripe-shaped fog image did not further readily occur, and the evaluation became the "◎" level.

In the STUDY 4, by changing the condition of the magnetic flux density MC of the delivering pole 106 in the first developing roller 30, a condition satisfying F1≤F2 of the formula 3 is obtained, so that it was confirmed that an effect similar to the effect of the STUDY 2 can be obtained. In the STUDY 5, by changing both the conditions of the magnetic flux density MB of the first feeding pole 105 in the first developing roller 30 and the magnetic flux density MC of the delivering pole 106 in the first developing roller 30, the condition satisfying F1≤F2' of the formula 6 is obtained, so that similarly as in the STUDY 3, it was confirmed that the occurrence status of the vertical stripe-shaped fog image of the output image become the "◎" level.

In the above-described experiment, the magnetic flux density MB of the first feeding pole 105 in the first developing roller 30 is not always decreased to any value. When the magnetic force of the magnetic flux density MB of the first feeding pole 105 in the first developing roller 30 is excessively decreased, a developer feeding property of the first developing roller 30 lowers. For this reason, the magnetic flux density MB may preferably be maintained at a magnitude not less than the magnetic flux density MC on the delivering pole 106 in the first developing roller 30. In this embodiment, MA≥MB>MC is satisfied.

In addition, also, as regards the magnetic flux density MC on the delivering pole 106 in the first developing roller 30, when the magnetic force is excessively increased, the delivery of the developer with the second developing roller 31 does not readily hold. When the magnetic flux density MC on the delivering pole 106 in the first developing roller 30 becomes larger than the magnetic flux density MD on the receiving pole 201 in the second developing roller 31, the developer is not readily moved toward the second developing roller 31. MD is an absolute value of the maximum of a magnetic flux density normal component of the receiving pole 201 in the second developing roller 31. For this reason, it is preferable that the magnetic flux density MC on the delivering pole 106 in the first developing roller 30 is equal to or smaller than the magnetic flux density MD on the receiving pole 201 in the second developing roller 31 in terms of the magnetic force. In the above-described embodiment, the magnetic flux density MD of the receiving pole 201 in the second developing roller 31 was set to 60 [mT]. That is, in this embodiment, MC≤MD may preferably be satisfied, and MC<MD may more preferably be satisfied.

As described above, according to this embodiment, the occurrence of the image defect can be suppressed. That is, in the developing device 1Y of this embodiment, the attracting force F1 between the first feeding pole 105 in the first developing roller 30 and the second feeding pole 202 in the second developing roller 31 is made not more than the repelling force F2 based on the delivering pole 106 in the first developing roller 30 and the second feeding pole 202 in the second developing roller 31, so that it is possible to suppress the delivery of the developer from the second feeding pole 202 toward the first feeding pole 105 in the first developing roller 30. For this reason, it is possible to suppress the occurrence of the above-described stripe-shaped fog image.

Particularly, even in an image forming apparatus in which an image forming speed (process speed) is high, the delivery of the developer from the second feeding pole 202 in the second developing roller 31 toward the first feeding pole 105 in the first developing roller 30 can be suppressed, so that the occurrence of the above-described stripe-shaped fog image can be suppressed. Further, the developer is stably circulated from the first developing roller 30 and then by the second developing roller 31, the peeling roller 32, and the developer circulating portion 46, so that it is possible to provide the developing device 1Y and the image forming apparatus 100 in which stable image output is carried out.

Second Embodiment

Figure 9:
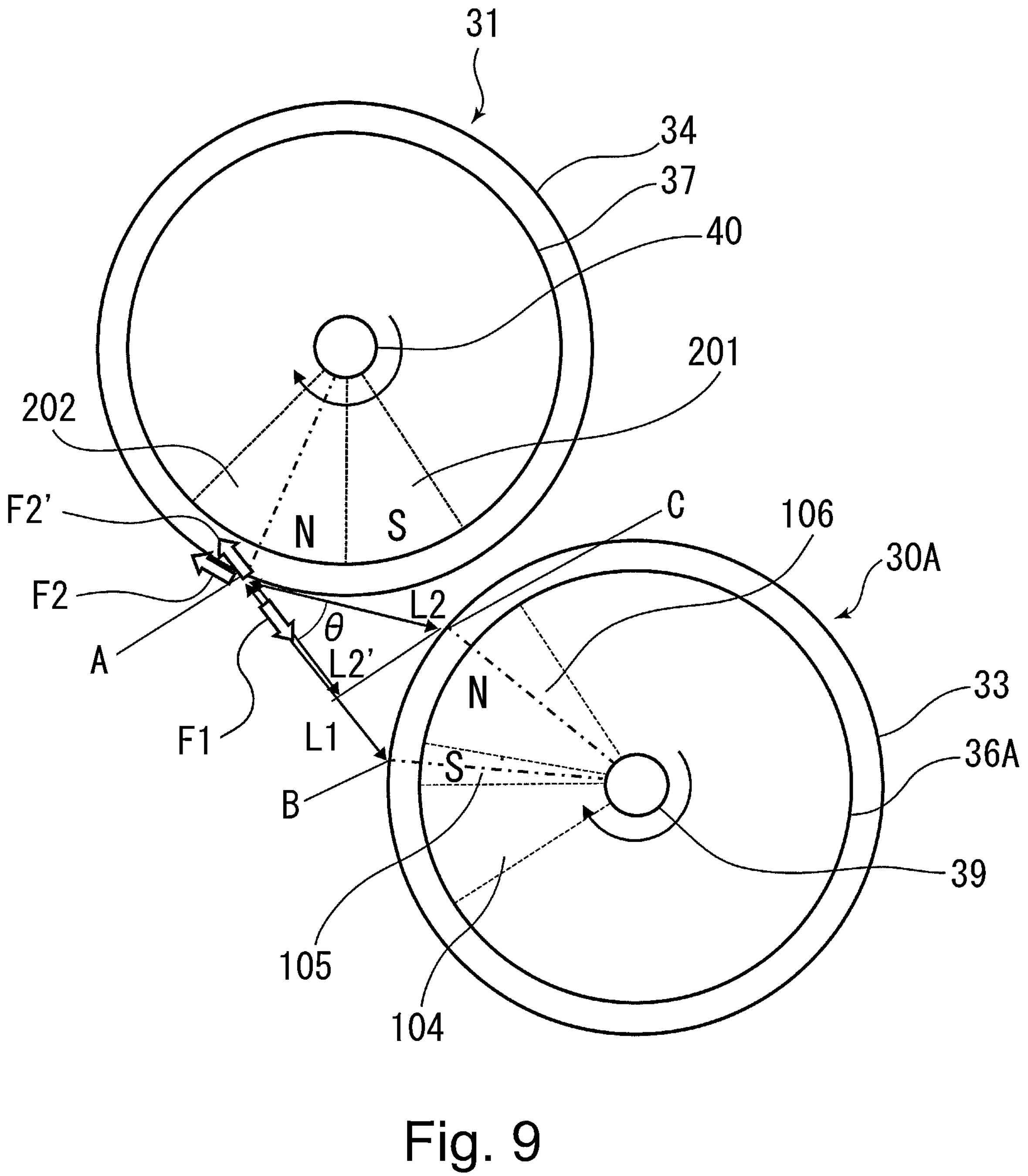
FIG. 9 is a schematic view showing a relationship of a magnetic pole arrangement between a first developing roller and a second developing roller in a second embodiment, in which a relationship between an attracting force F1 and repelling forces F2 and F2' is shown.

A second embodiment will be described using FIGS. 9 to 10. This embodiment is different from the first embodiment in constitution of a first feeding pole 105 in a first developing roller 30A. Other constitutions and actions are similar to those in the first embodiment, and therefore, as regards similar constitutions, description and illustration are omitted or briefly made by adding the same reference numerals or symbols, and in the following, a difference from the first embodiment will be principally described.

In this embodiment, compared with the constitution of the first embodiment, a shape of the first feeding pole 105 in the first developing roller 30A is changed. Specifically, as shown in FIG. 9, the first feeding pole 105 in a first magnet 36A of the first developing roller 30A has a constitution in which a point B which is a position where a magnetic flux density normal component in the first feeding pole 105 becomes maximum is closer toward the first delivering pole 104 in the first developing roller 30A than that in the first embodiment. Chain lines shown in FIG. 9 indicate a position (peak position) of a magnetic flux density maximum in the second feeding pole 202 of the second magnet 37 in the normal direction of the second sleeve 34 and indicate positions (peak positions) of magnetic flux density maximums in the first feeding pole 105 and the delivering pole 106 of the first magnet 36A in the normal direction of the first sleeve 33.

Thus, by making the position of the point B of the first feeding pole 105 closer toward the first delivering pole 104 side, a rectilinear line L1, to the point B, from the point A which is a position, on the second sleeve 34, of a maximum of a magnetic flux density normal component of the second feeding pole 202 can be made longer than that in the first embodiment. That is, it is preferable that L1>L2 is satisfied. Incidentally, L1>L2 is satisfied also in the above-described first embodiment, but in this embodiment, a difference between L1 and L2 is made larger than that in the first embodiment. Thus, when the distance L1 is increased, a value of the attracting force F1 between the first feeding pole 105 in the first developing roller 30A and the second feeding pole 202 in the second developing roller 31 becomes small. That is, in this embodiment, by changing the distance L1, the condition of F1≤F2 in the above-described formula 3, and the condition of F1≤F2' in the above-described formula 6 are satisfied.

Experiment

Next, an experiment in which an occurrence status of a stripe-shaped fog image (abnormal image) in the above-described constitution was checked will be described. In the example, the above-described distance 1 was changed from the condition REF, and images were outputted by image forming apparatuses in which delivering poles in various conditions REF, STUDY 6, and STUDY 7 are incorporated. Then, the occurrence status of the stripe-shaped fog image on the output image was checked.

Other conditions and evaluation of the experiment are the same as those of the experiment described in the first embodiment. A result of this experiment is shown in FIG. 10.

As shown in FIG. 10, in the STUDY 6, the position of the point B is changed to a position of L1=13 mm (at this time, an angle θ formed by the rectilinear line AB and the rectilinear line AC is 38°), and then, similarly as in the first embodiment, when the attracting force F1 based on the first feeding pole 105 in the first developing roller 30 and the second feeding pole 202 in the second developing roller 31 and the repelling force F2 based on the delivering pole 106 in the first developing roller 30 and the second feeding pole 202 in the second developing roller 31 are derived, the condition satisfying F1≤F2 of the formula 3 was obtained. Further, it was able to be confirmed that the vertical stripe-shaped fog image of the output image did not readily occur and thus the evaluation became the "○" level.

In the STUDY 7, the position of the point B is changed to a position of L1=15 mm (at this time, an angle θ formed by the rectilinear line AB and the rectilinear line AC is 40°), and then, similarly as in the first embodiment, when the attracting force F1 based on the first feeding pole 105 in the first developing roller 30 and the second feeding pole 202 in the second developing roller 31 and the repelling force F2 based on the delivering pole 106 in the first developing roller 30 and the second feeding pole 202 in the second developing roller 31 are derived, the condition satisfying F1≤F2 of the formula 6 was obtained. Further, it was able to be confirmed that the occurrence status of the vertical stripe-shaped fog image of the output image became the "◎" level. Thus, also in this embodiment, similarly as in the first embodiment, the occurrence of the image defect can be suppressed.

Third Embodiment

A third embodiment will be described using FIGS. 11 and 12. This embodiment is different from the first embodiment in constitution of respective magnetic poles in a first developing roller 30B. Other constitutions and actions are similar to those in the first embodiment, and therefore, as regards similar constitutions, description and illustration are omitted or briefly made by adding the same reference numerals or symbols, and in the following, a difference from the first embodiment will be principally described.

Figure 11:
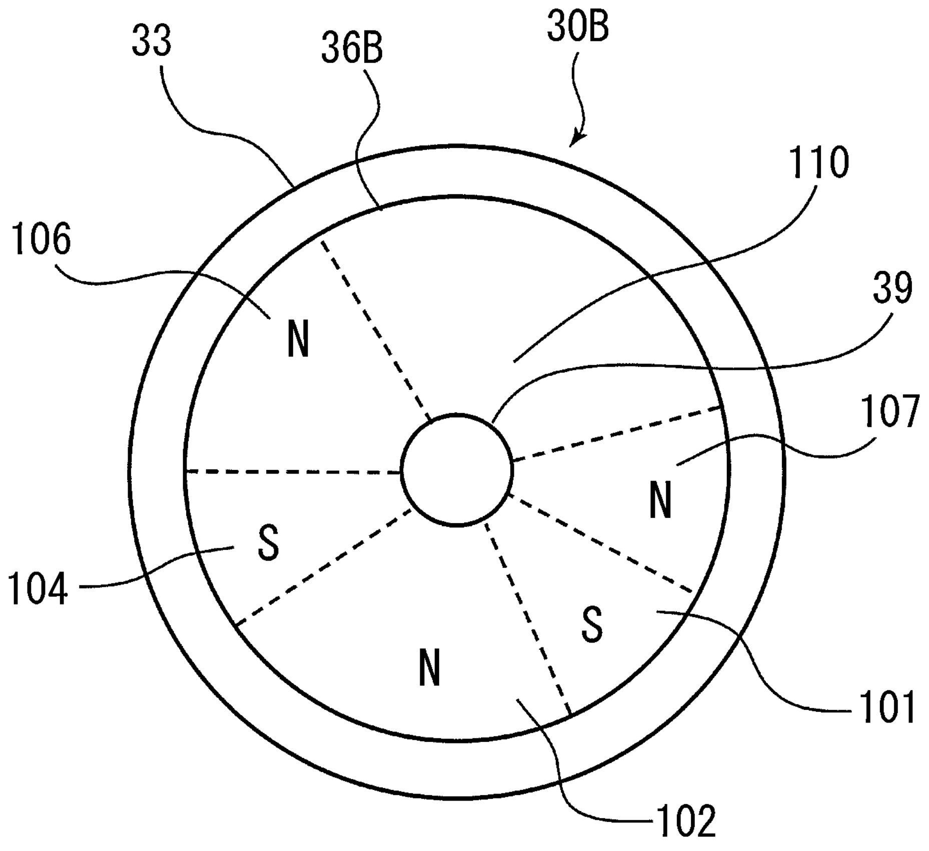
FIG. 11 is a schematic view showing a magnetic pole arrangement of a first developing roller in a third embodiment.
Figure 12:
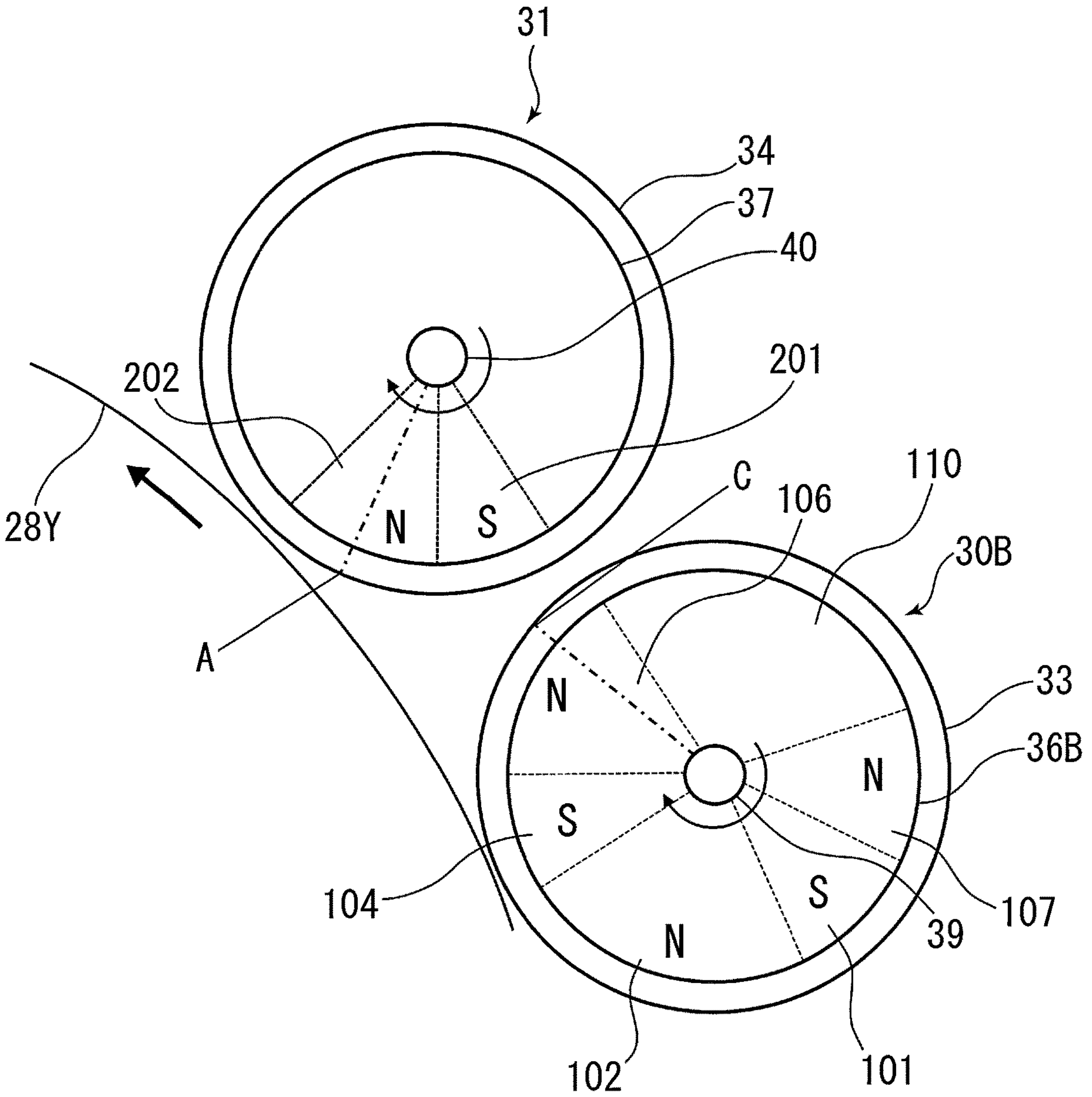
FIG. 12 is a schematic view showing a relationship of a magnetic pole arrangement between the first developing roller and a second developing roller in the third embodiment.

In this embodiment, as shown in FIGS. 11 and 12, the first magnet 36B in the first developing roller 30B has a 5-pole-based magnetic pole constitution in which the first feeding pole 105 and the magnetic pole (feeding pole) 103 which were included in the first developing roller 30 shown in FIG. 3 are omitted is employed. In this constitution, the first delivering pole 104 in the first magnet 36 of FIG. 3 was the N pole, but in the first magnet 36B in this embodiment, the first delivering pole 104 in the S pole.

Further, other magnetic poles 101, 102, 106, and 107 are the same in polarity as those of the first magnet 36 in FIG. 3. Further, a constitution in which the magnetic flux density and the position (position of the point C for the delivering pole 106) where the magnetic flux density normal component becomes maximum in each of the magnetic poles are the same as those of the first developing roller 30 in FIG. 3. Further, the second developing roller 31 is the same as the second developing roller 31 of which second magnet 37 inside is shown in FIG. 4. For this reason, the magnetic flux density and the position (position of the point A for the second feeding pole 202) where the magnetic flux density normal component becomes maximum in each of the magnetic poles are the same as those of the second developing roller 31 in FIG. 4.

Incidentally, chain lines shown in FIG. 12 indicate a position (peak position) of a magnetic flux density maximum in the second feeding pole 202 of the second magnet 37 in the normal direction of the second sleeve 34 and indicate positions (peak positions) of magnetic flux density maximums in the delivering pole 106 of the first magnet 36B in the normal direction of the first sleeve 33.

In such a case of this embodiment, the first delivering pole 104 of the first magnet 36B is positioned upstream of and adjacent to the delivering pole 106 with respect to the rotational direction of the first sleeve 33. A magnetic characteristic of the first developing roller 30B and the second developing roller 31 in this embodiment in which such a constitution is employed is shown in FIG. 12. In this embodiment, a magnetic pole attracting between itself and the second feeding pole 202 in the second developing roller 31 is the first delivering pole 104 in the first developing roller 30B. However, from the second feeding pole 202 in the second developing roller 31, the first delivering pole 104 in the first developing roller 30B is away in distance when compared with the constitution of the first embodiment. Further, in a position opposing the first delivering pole 104 in the first developing roller 30B through the first sleeve 33, the photosensitive drum 28Y is provided. Between the first delivering pole 104 and the photosensitive drum 28Y, the development of the electrostatic latent image by the developer is carried out, and therefore, the delivery of the developer between the second feeding pole 202 in the second developing roller 31 and the first delivering pole 104 in the first developing roller 30B does not readily occur. Also, in such a case of this embodiment, similarly as in the first embodiment, the occurrence of the stripe-shaped fog image can be suppressed.

Fourth Embodiment

A fourth embodiment will be described using FIGS. 13 to 15. This embodiment is different from the first embodiment in constitutions of a first magnet 36C in a first developing roller 30C and a second magnet 37A in a second developing roller 31A. Other constitutions and actions are similar to those in the first embodiment, and therefore, as regards similar constitutions, description and illustration are omitted or briefly made by adding the same reference numerals or symbols, and in the following, a difference from the first embodiment will be principally described.

The number and polarity of magnetic poles of the first magnet 36C and the second magnet 37A in this embodiment are the same as those of the first magnet 36 and the second magnet 37 in the first embodiment. However, in this embodiment, the following constitutions are satisfied.

Figure 13:
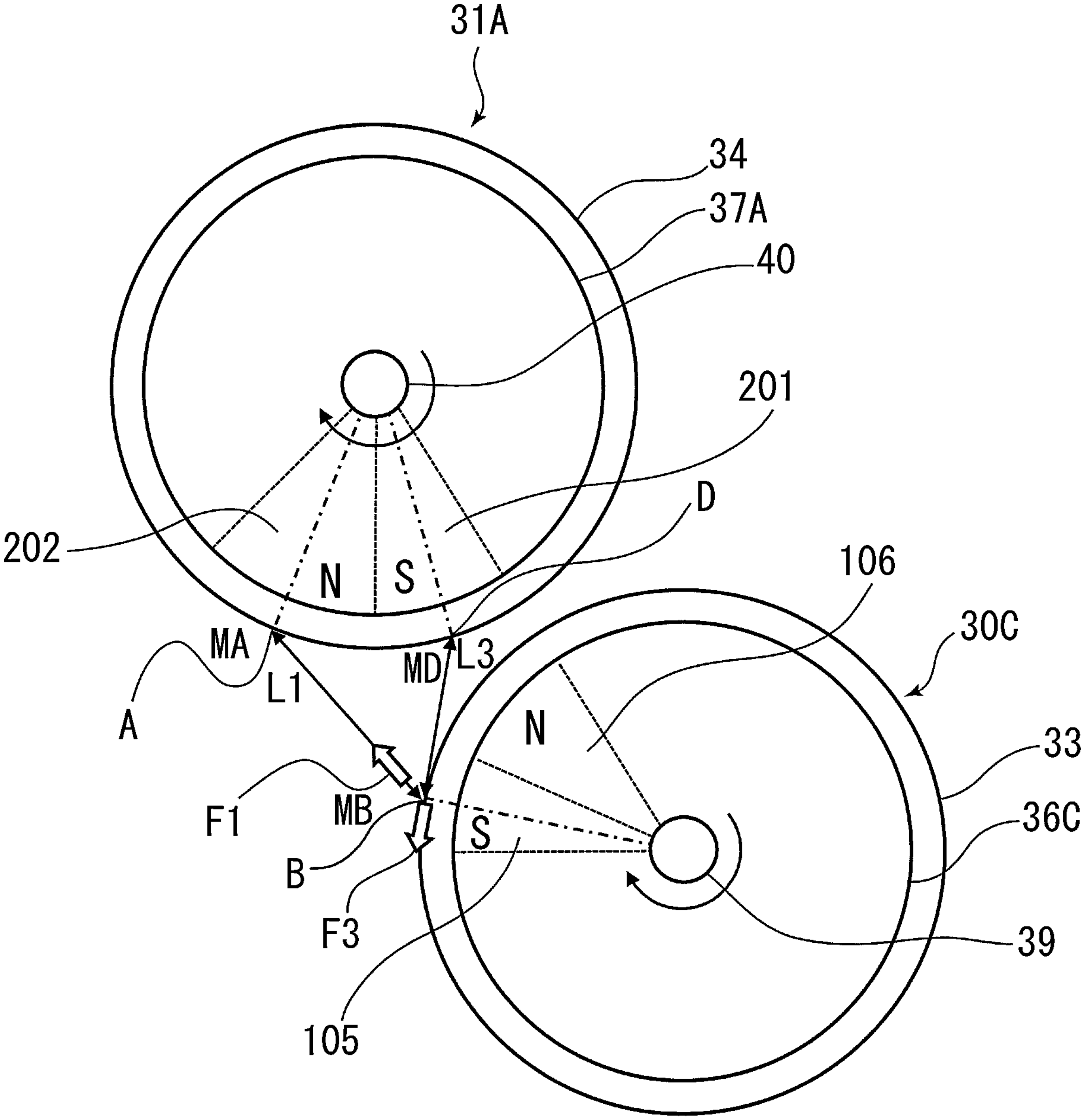
FIG. 13 is a schematic view showing a relationship of a magnetic pole arrangement between a first developing roller and a second developing roller in a fourth embodiment, in which a relationship between an attracting force F1 and a repelling force F3 is shown.

First, as shown in FIG. 13, an absolute value of a maximum of a magnetic flux density normal component of the receiving pole 201 in the second developing roller 31A is MD [mT], and a position of this maximum on the second sleeve 34 is a point D. Further, a rectilinear line distance between the points A and B is L1, and a rectilinear line distance between the points B and D is L3. Further, a magnetic force acting on the developer, with respect to a rectilinear line AB direction connecting the points A and B, between the second feeding pole 202 on the second sleeve 34 and the first feeding pole 105 on the first sleeve 33 is F1. Further, a magnetic force acting on the developer, with respect to a rectilinear line BD direction connecting the points B and D, between the first feeding pole 105 on the first sleeve 33 and the receiving pole 201 on the second sleeve 34 is F3.

At this time, a repelling force F3 acting between the first feeding pole 105 in the first developing roller 30 and the receiving pole 201 in the second developing roller 31A can be expressed by:

$$F3 = k \times MB \times MD / L3^2. \qquad \text{(formula 7)}$$

Incidentally, k is coefficient similar to the coefficient in the first embodiment. Further, the attracting force F1 can also be expressed by the formula 1 similarly as in the first embodiment.

In the first feeding pole 105 in the first developing roller 30, in order to suppress the delivery of the developer between the second feeding pole 202 in the second developing roller 31A and the first feeding pole 105 in the first developing roller 30, it may only be required that the attracting force F1 from the first feeding pole 105 in the first developing roller 30 toward the second feeding pole 202 in the second developing roller 31A is not more than the repelling force F3 based on the first feeding pole 105 in the first developing roller 30 and the receiving pole 201 in the second developing roller 31A. That is, for the above-described formulas 1 and 7, the following relationship may only be required to satisfy the following relationship:

$$F1 \le F3. \qquad \text{(formula 8)}$$

That is, in this embodiment, the magnetic flux density and an arrangement of the first feeding pole 105, the second feeding pole 202, and the receiving pole 201 are set so as to satisfy the formula 8. Specifically, positions of the above-described MA, MB, and MD and the points A, B, and D are set so as to satisfy the formula 8.

Figure 14:
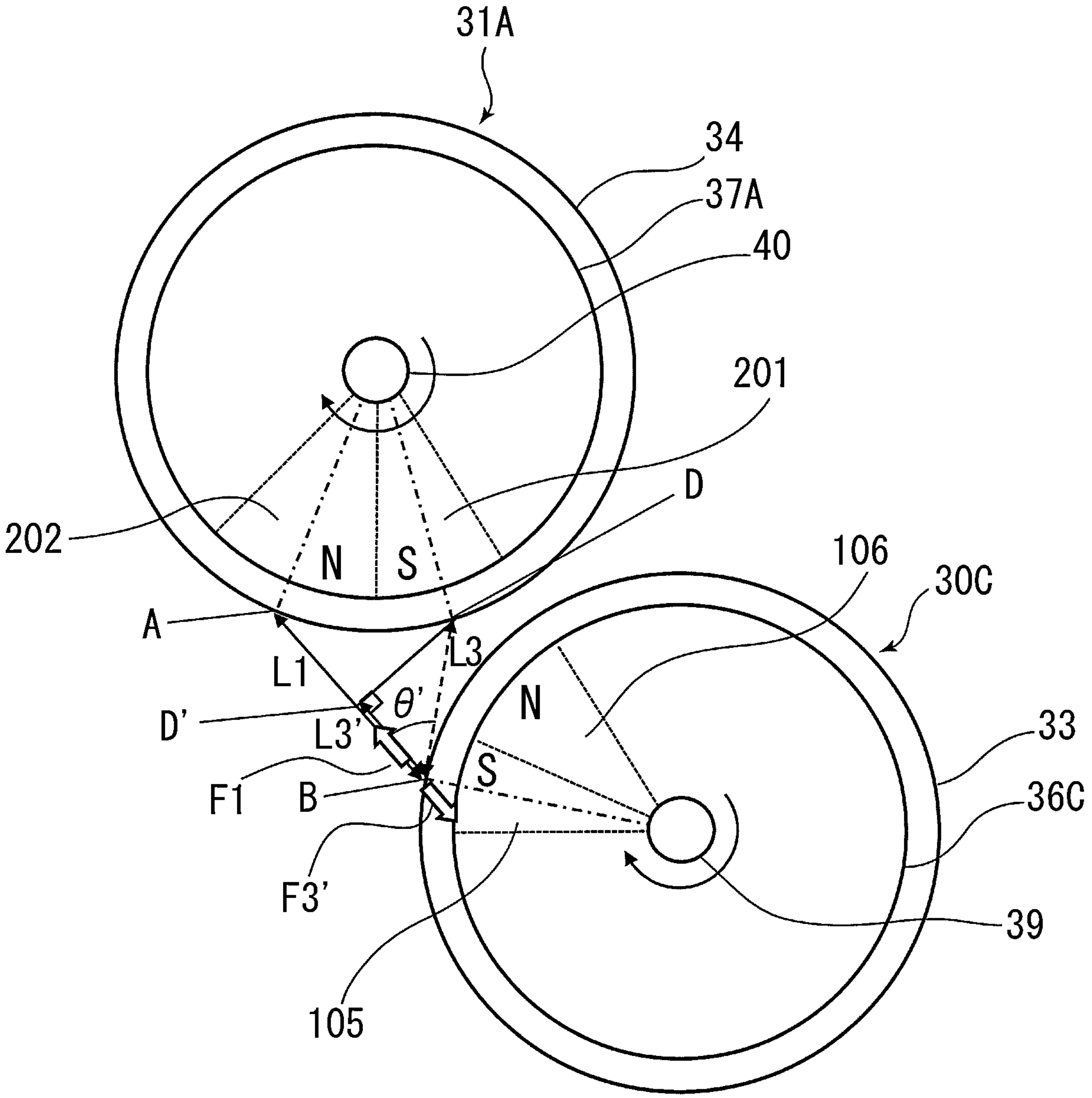
FIG. 14 is a schematic view showing a relationship of a magnetic pole arrangement between the first developing roller and the fourth developing roller in the first embodiment, in which a relationship between the attracting force F1 and a repelling force F3' is shown.

Further, in FIG. 14, a relationship between a force component F3' of the repelling force F3 in the rectilinear line AB direction and the above-described attracting force F1 is shown. When an angle formed by the rectilinear lines AB and BD is θ, a point on the rectilinear line AB when a perpendicular line is drawn from the point D onto the rectilinear line AB is D', and a rectilinear line distance between the points B and D' is L3', L3' can be expressed by the following formula 9:

$$L3' = L3 \times \cos\theta'. \qquad \text{(formula 9)}$$

In the first feeding pole 105 in the first developing roller 30, in order to cancel the attracting force F1 received from the second feeding pole 202 in the second developing roller 31, it is desirable that a repelling force F3' in a rectilinear line BD' direction between the receiving pole 201 in the second developing roller 31 and the first feeding pole 105 in the first developing roller 30 is the attracting force F1 or more. F3' is a force component of F3 in the rectilinear line AB direction and can be expressed by the following formula 10:

$$F3' = F3 \times \cos\theta'. \qquad \text{(formula 10)}$$

Further, in order to cancel the attracting force F1 by the repelling force F3', the following relationship may desirably hold:

$$F1 \le F3'. \qquad \text{(formula 11)}$$

That is, in this embodiment, it is preferable that the formula 11 is further satisfied, and it is preferable that the magnetic flux density and the arrangement of, the first feeding pole 105, the second feeding pole 202, and the receiving pole 201 are set so as to satisfy the formula 6. Specifically, the positions of the above-described MA, MB, and MD and the points A, B and D are set so as to satisfy the formula 11.

Experiment

Next, an experiment in which an occurrence status of a stripe-shaped fog image (abnormal image) in the above-described constitution was checked will be described. In the example, the magnetic flux density MA of the second feeding pole 202 in the second developing roller 31A, the magnetic flux density MB of the first feeding pole 105 in the first developing roller 30C, and the magnetic flux density MD of the receiving pole 201 in the second developing roller 31A were changed from a condition REF, and images were outputted by image forming apparatuses in which delivering poles in various conditions REF and STUDY8 to STUDY12 are incorporated. Then, the occurrence status of the stripe-shaped fog image on the output image was checked.

Incidentally, in the experiment, the position of each of the point A where the magnetic flux density on the second feeding pole 202 in the second developing roller 31A becomes maximum, the point B where the magnetic flux density on the first feeding pole 105 in the first developing roller 30C becomes maximum, and the point C where the magnetic flux density on the receiving pole 201 in the second developing roller 31A becomes maximum was not changed. That is, L1 and L3 are fixed. Further, the angle θ' formed by the rectilinear lines AB and BD was set to 40°. Other conditions and evaluation of the experiment are the same as those described in the first embodiment. A result of this experiment is shown in FIG. 15.

As shown in FIG. 15, in the experiment, the magnetic flux density MA of the second feeding pole 202 in the second developing roller 31A was changed in the STUDY 8 to the STUDY 10. As is apparent from FIG. 15, by decreasing MA, the vertical stripe-shaped fog image did not readily occur. In the STUDY 9, when the respective values are applied to the formulas 1 and 7, conditions each satisfying F1≤F3 of the formula 8 are obtained, so that evaluation of the occurrence status of the vertical stripe-shaped fog image of the output image became the "○" level. Similarly, in the STUDY 10, when the respective values are applied to the formulas 1 and 7 and then to the formula 10, a condition satisfying F1≤F3' of the formula 11 is obtained, so that it was able to be confirmed that the vertical stripe-shaped fog image did not further readily occur, and the evaluation became the "◎" level.

In the STUDY 11, by changing the condition of the magnetic flux density MD of the receiving pole 201 in the second developing roller 31A, a condition satisfying F1≤F3 of the formula 8 is obtained, so that it was confirmed that an effect similar to the effect of the STUDY 9 can be obtained. In the STUDY 12, by changing both the conditions of the magnetic flux density MA of the second feeding pole 202 in the second developing roller 31A and the magnetic flux density MD of the receiving pole 201 in the second developing roller 31A, the condition satisfying F1≤F3' of the formula 11 is obtained, so that similarly as in the STUDY 10, it was confirmed that the occurrence status of the vertical stripe-shaped fog image of the output image become the "◎" level.

In the above-described experiment, the magnetic flux density MA of the second feeding pole 202 in the second developing roller 31A is not always decreased to any value. When the magnetic force of the magnetic flux density MA of the second feeding pole 202 in the second developing roller 31A is excessively decreased, a developer feeding property of the second developing roller 31A lowers. For this reason, the magnetic flux density MA may preferably be maintained at a magnitude not less than the magnetic flux density MD on the receiving pole 201 in the second developing roller 31A. In this embodiment, MB≥MA>MD is satisfied.

In addition, also, as regards the magnetic flux density MD on the receiving pole 201 in the second developing roller 31A, when the magnetic force is excessively increased, the feeding property of the developer on the second developing roller 31A lowers. When the magnetic flux density MD on the receiving pole 201 in the second developing roller 31A becomes larger than the magnetic flux density MA on the second feeding pole 202 in the second developing roller 31A, the developer is not readily moved toward a downstream side of the rotational direction of the second sleeve 34. For this reason, it is preferable that the magnetic flux density MD on the receiving pole 201 in the second developing roller 31A is equal to or smaller than the magnetic flux density MD on the second feeding pole 202 in the second developing roller 31A in terms of the magnetic force. That is, in this embodiment, MD≤MA may preferably be satisfied, and MD<MA may more preferably be satisfied.

As described above, according to this embodiment, the occurrence of the image defect can be suppressed. That is, in the developing device 1Y of this embodiment, the attracting force F1 between the first feeding pole 105 in the first developing roller 30C and the second feeding pole 202 in the second developing roller 31A is made not more than the repelling force F3 based on the first feeding pole 105 in the first developing roller 30C and the receiving pole 201 in the second developing roller 31A, so that it is possible to suppress the delivery of the developer from the second feeding pole 202 toward the first feeding pole 105 in the first developing roller 30C. For this reason, it is possible to suppress the occurrence of the above-described stripe-shaped fog image.

Fifth Embodiment

Figure 16:
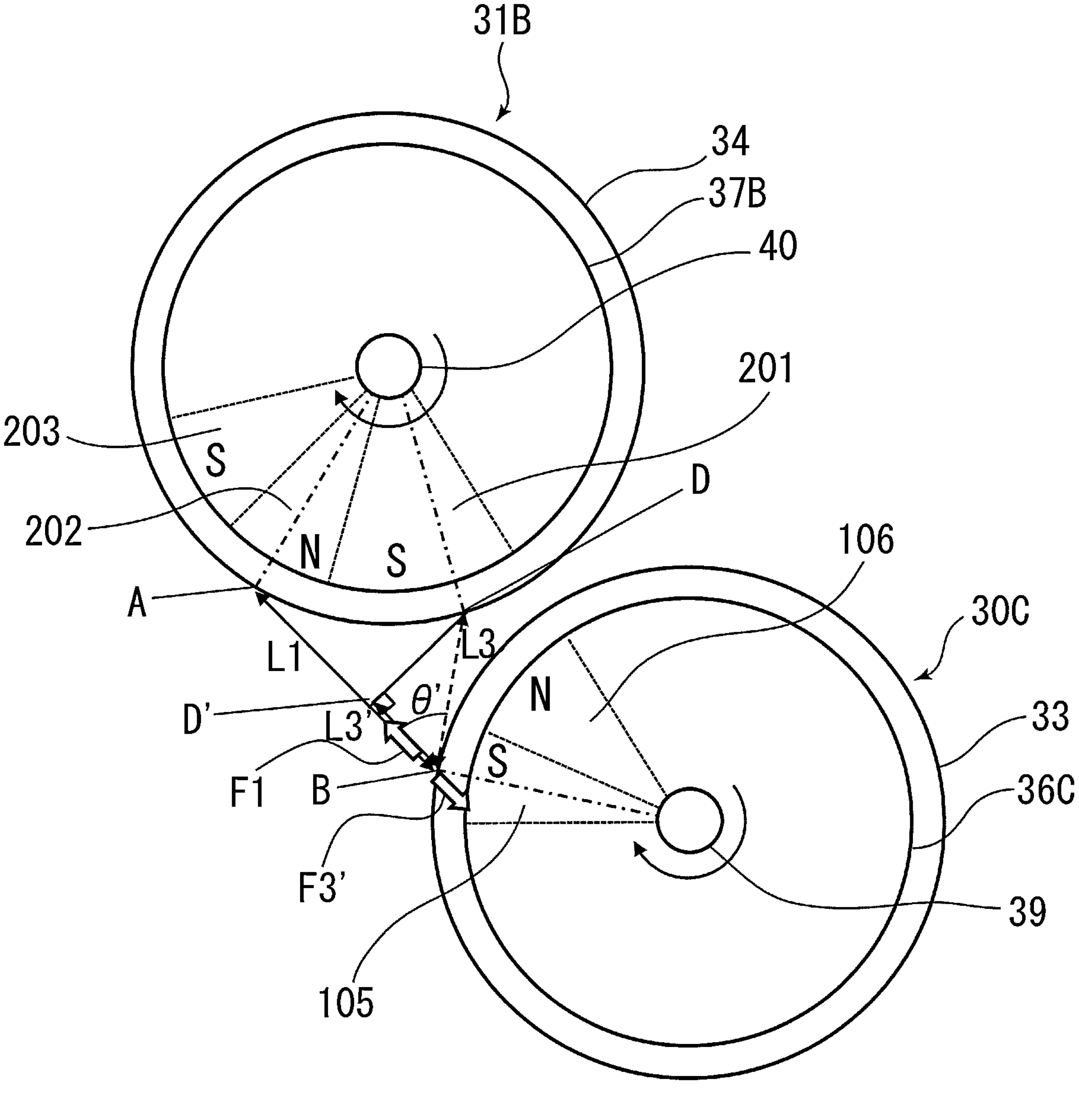
FIG. 16 is a schematic view showing a relationship of a magnetic pole arrangement between a first developing roller and a second developing roller in a fifth embodiment, in which a relationship between an attracting force F1 and repelling forces F3' is shown.

A second embodiment will be described using FIGS. 16 to 17. This embodiment is different from the first embodiment in constitution of a second feeding pole 202 in a second developing roller 31B. Other constitutions and actions are similar to those in the fourth embodiment, and therefore, as regards similar constitutions, description and illustration are omitted or briefly made by adding the same reference numerals or symbols, and in the following, a difference from the fourth embodiment will be principally described.

In this embodiment, compared with the constitution of the fourth embodiment, a shape of the second feeding pole 202 in the second developing roller 31B is changed. Specifically, as shown in FIG. 16, the second feeding pole 202 in a second magnet 37B of the second developing roller 31B has a constitution in which a point A which is a position where a magnetic flux density normal component in the second feeding pole 202 becomes maximum is closer toward the second delivering pole 203 in the second developing roller 31B than that in the fourth embodiment. Chain lines shown in FIG. 16 indicate a position (peak position) of a magnetic flux density maximum in the receiving pole 201 and the second feeding pole 202 of the second magnet 37B in the normal direction of the second sleeve 34 and indicate positions (peak positions) of magnetic flux density maximums in the first feeding pole 105 of the first magnet 36C in the normal direction of the first sleeve 33.

Thus, by making the position of the point A of the second feeding pole 202 closer toward the second delivering pole 203 side, a rectilinear line L1, to the point A, from the point B which is a position, on the first sleeve 33, of a maximum of a magnetic flux density normal component of the first feeding pole 105 can be made longer than that in the fourth embodiment. That is, it is preferable that L1>L3 is satisfied. Incidentally, L1>L3 is satisfied also in the above-described fourth embodiment, but in this embodiment, a difference between L1 and L3 is made larger than that in the fourth embodiment. Thus, when the distance L1 is increased, a value of the attracting force F1 between the first feeding pole 105 in the first developing roller 30C and the second feeding pole 202 in the second developing roller 31B becomes small. That is, in this embodiment, by changing the distance L1, the condition of F1≤F3 in the above-described formula 8, and the condition of F1≤F3' in the above-described formula 11 are satisfied.

Experiment

Next, an experiment in which an occurrence status of a stripe-shaped fog image (abnormal image) in the above-described constitution was checked will be described. In the example, the above-described distance 1 was changed from the condition REF, and images were outputted by image forming apparatuses in which delivering poles in various conditions REF, STUDY 13, and STUDY 14 are incorporated. Then, the occurrence status of the stripe-shaped fog image on the output image was checked.

Other conditions and evaluation of the experiment are the same as those of the experiment described in the first embodiment. A result of this experiment is shown in FIG. 17.

As shown in FIG. 17, in the STUDY 13, the position of the point A is changed to a position of L1=11 mm (at this time, an angle θ' formed by the rectilinear line AB and the rectilinear line BD is 44°), and then, similarly as in the fourth embodiment, when the attracting force F1 based on the first feeding pole 105 in the first developing roller 30C and the second feeding pole 202 in the second developing roller 31B and the repelling force F3 based on the first feeding pole 105 in the first developing roller 30C and the receiving pole 201 in the second developing roller 31B are derived, the condition satisfying F1≤F3 of the formula 8 was obtained. Further, it was able to be confirmed that the vertical stripe-shaped fog image of the output image did not readily occur and thus the evaluation became the "○" level.

In the STUDY 14, the position of the point A is changed to a position of L1=13 mm (at this time, an angle θ' formed by the rectilinear line AB and the rectilinear line BD is 49°), and then, similarly as in the fourth embodiment, when the attracting force F1 based on the first feeding pole 105 in the first developing roller 30C and the second feeding pole 202 in the second developing roller 31B and the repelling force F3' based on the first feeding pole 105 in the first developing roller 30C and the receiving pole 201 in the second developing roller 31B are derived, the condition satisfying F1≤F3' of the formula 11 was obtained. Further, it was able to be confirmed that the occurrence status of the vertical stripe-shaped fog image of the output image became the "⊚" level. Thus, also in this embodiment, similarly as in the fourth embodiment, the occurrence of the image defect can be suppressed.

Sixth Embodiment

A sixth embodiment will be described using FIGS. 18 and 19. This embodiment is different from the fourth embodiment in constitution of respective magnetic poles in a second developing roller 31C. Other constitutions and actions are similar to those in the fourth embodiment, and therefore, as regards similar constitutions, description and illustration are omitted or briefly made by adding the same reference numerals or symbols, and in the following, a difference from the fourth embodiment will be principally described.

Figure 18:
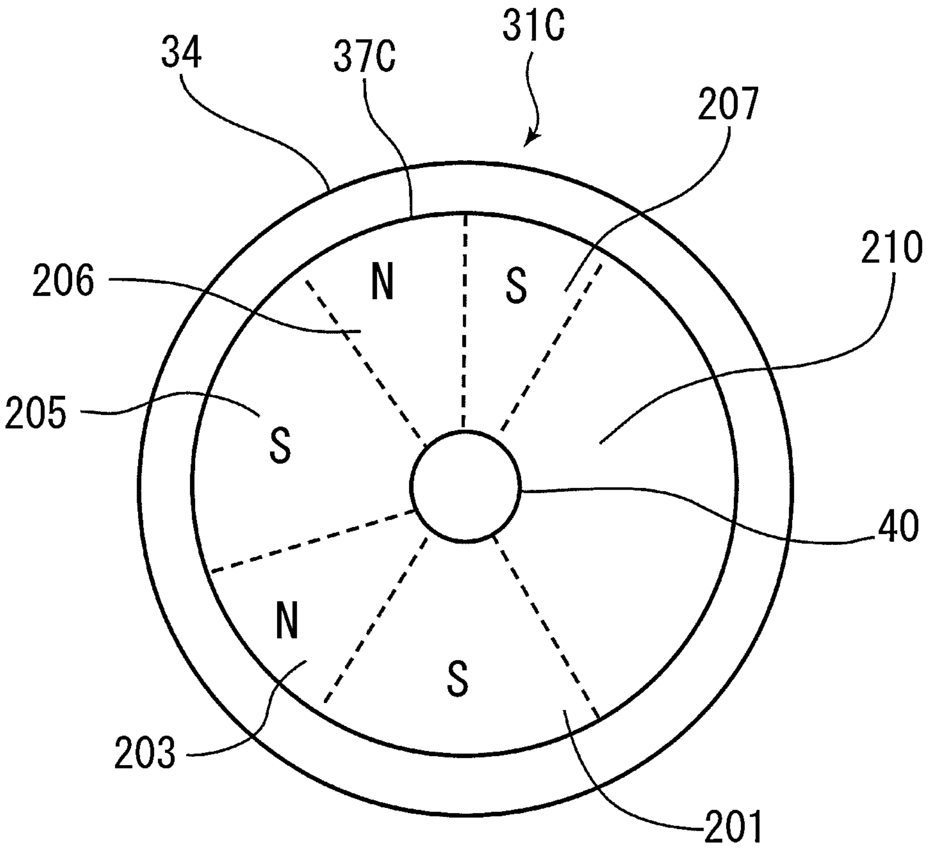
FIG. 18 is a schematic view showing a magnetic pole arrangement of a second developing roller in a sixth embodiment.
Figure 19:
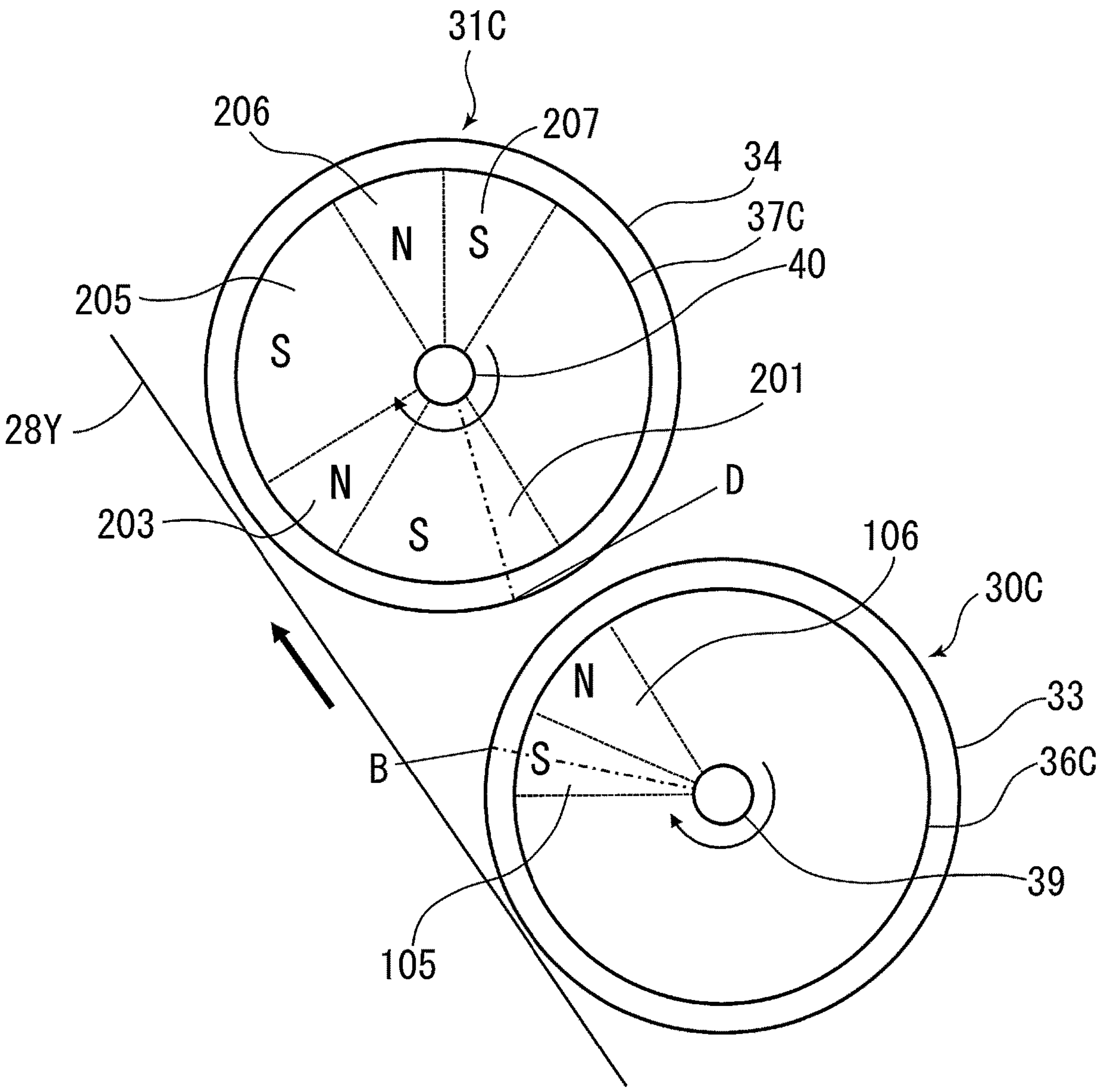
FIG. 19 is a schematic view showing a relationship of a magnetic pole arrangement between the first developing roller and a second developing roller in the sixth embodiment.

In this embodiment, as shown in FIGS. 18 and 19, the second magnet 37C in the second developing roller 31C has a 5-pole-based magnetic pole constitution in which the second feeding pole 202 and the magnetic pole (feeding pole) 204 which were included in the second developing roller 31 shown in FIG. 4 are omitted is employed. In this constitution, the second delivering pole 203 in the second magnet 37 of FIG. 4 was the S pole, but in the second magnet 37C in this embodiment, the second delivering pole 203 in the N pole.

Further, other magnetic poles 201, 205, 206, and 207 are the same in polarity as those of the second magnet 37 in FIG. 4. Further, a constitution in which the magnetic flux density and the position (position of the point D for the receiving pole 201) where the magnetic flux density normal component becomes maximum in each of the magnetic poles are the same as those of the second developing roller 31 in FIG. 4. Further, the first developing roller 30C is the same as the first developing roller 30C of which first magnet 36 inside is shown in FIG. 13. For this reason, the magnetic flux density and the position (position of the point B for the first feeding pole 105) where the magnetic flux density normal component becomes maximum in each of the magnetic poles are the same as those of the first developing roller 30C in FIG. 13.

Incidentally, chain lines shown in FIG. 19 indicate a position (peak position) of a magnetic flux density maximum in the receiving pole 201 of the second magnet 37C in the normal direction of the second sleeve 34 and indicate positions (peak positions) of magnetic flux density maximums in the first feeding pole 105 of the first magnet 36C in the normal direction of the first sleeve 33.

In such a case of this embodiment, the second delivering pole 203 of the second magnet 37C is positioned downstream of and adjacent to the receiving pole 201 with respect to the rotational direction of the second sleeve 34. A magnetic characteristic of the first developing roller 30C and the second developing roller 31C in this embodiment in which such a constitution is employed is shown in FIG. 19. In this embodiment, a magnetic pole attracting between itself and the first feeding pole 105 in the first developing roller 30C is the second delivering pole 203 in the second developing roller 31C. However, from the first feeding pole 105 in the second developing roller 31C, the second delivering pole 203 in the second developing roller 31C is away in distance when compared with the constitution of the fourth embodiment. Further, in a position opposing the second delivering pole 203 in the second developing roller 31C through the second sleeve 34, the photosensitive drum 28Y is provided. Between the second delivering pole 203 and the photosensitive drum 28Y, the development of the electrostatic latent image by the developer is carried out, and therefore, the delivery of the developer between the first feeding pole 105 in the first developing roller 30C and the second delivering pole 203 in the second developing roller 31C does not readily occur. Also, in such a case of this embodiment, similarly as in the fourth embodiment, the occurrence of the stripe-shaped fog image can be suppressed.

Other Embodiments

The above-described first, second and third embodiments have an effect of suppressing the vertical stripe-shaped fog image generated by the delivery of the developer between the first feeding pole 105 in the first developing rollers 30, 30A, and 30B and the second feeding pole 202 in the second developing roller 31 on the basis of a relationship between the repelling force F2 based on the delivering pole 106 in the first developing rollers 30, 30A, and 30B and the second feeding pole 202 in the second developing roller 31 and the attracting force F1 between the first feeding pole 105 in the first developing rollers 30, 30A, and 30B and the second feeding pole 202 in the second developing roller 31. On the other hand, the above-described fourth, fifth, and sixth embodiments have an effect of suppressing the vertical stripe-shaped fog image generated by the delivery of the developer between the first feeding pole 105 in the first developing roller 30C and the second feeding pole 202 in the second developing rollers 31A, 31B, and 31C on the basis of a relationship between the repelling force F3 based on the receiving pole 201 in the second developing rollers 31A, 31B, and 31C and the first feeding pole 105 in the first developing roller 30C and the attracting force F1 between the first feeding pole 105 in the first developing roller 30C and the second feeding pole 202 in the second developing rollers 31A, 31B, and 31C. Such first, second, and third embodiments can be further enhanced in effect of suppressing the vertical stripe-shaped fog image by being combined with each one of the fourth, fifth, and sixth embodiments. That is, the first developing roller and the second developing roller are constituted so as to satisfy the above-described condition of the formula 8 or the formula 11, in addition to the above-described condition of the formula 3 or the formula 6.

The present invention is not limited to the constitution of the above-described embodiments. For example, the image forming apparatus 100 is not limited to the MFP, but may also be a copying machine, a printer, or a facsimile machine. Further, the constitutions of the developer supplying screw 42, the developer stirring screw 43, and the developer collecting screw 44 are not particularly limited when the constitutions can convey the developer, and for example, it is possible to apply a helical blade, a paddle-like blade.

Further, in the above-described embodiments, a constitution in which the first sleeve 33 and the photosensitive drum 28Y are rotated in the same direction in mutually opposing positions and in which the second sleeve 34 and the photosensitive drum 28Y are rotated in the same direction in mutually opposing positions was described but the present invention is not limited thereto.

A constitution in which the rotation center O2 of the second developing roller 31 is disposed above the rotation center O1 of the first developing roller 30, in which the first sleeve 33 and the photosensitive drum 28Y are rotated in opposite directions in the mutually opposing positions, and in which the second sleeve 34 and the photosensitive drum 28Y are rotated in opposite directions in the mutually opposing positions may be employed. That is, in this constitution, counter development such that the photosensitive drum 28 is rotated from above to below in the vertical direction in a position where the photosensitive drum 28 opposes the first developing roller 30 is made, and counter development such that the photosensitive drum 28 is rotated from above to below in the vertical direction in a position where the photosensitive drum 28 opposes the second developing roller 31 is made. The present invention is also applicable to such a constitution. Further, in the case where three or more developing rollers are provided, the present invention is also applicable to arbitrary two developing rollers.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2023-185954 filed on Oct. 30, 2023 and 2024-174696 filed on Oct. 4, 2024, which are hereby incorporated by reference herein in their entirety.

What is claimed is:

1. A developing device comprising:

a developing container configured to accommodate a developer including toner and a carrier;

a first rotatable member to which the developer accommodated in the developing container is supplied and which carries and feeds the developer to a first developing position where an electrostatic latent image formed on an image bearing member is developed;

a first magnet provided non-rotatably and stationarily inside the first rotatable member, wherein the first magnet includes a first developing pole provided opposed to the image bearing member in the first developing position, a delivering pole provided downstream of the first developing pole with respect to a rotational direction of the first rotatable member, and a first feeding pole provided upstream of the delivering pole and adjacent to the delivering pole, with respect to the rotational direction of the first rotatable member, and having a magnetic polarity different from the delivering pole;

a second rotatable member provided opposed to the first rotatable member and to which the developer is delivered from the first rotatable member by a magnetic field generated by the first magnet, wherein the second rotatable member carries and feeds the developer to a second developing position where the electrostatic latent image is developed, and wherein a rotational direction of the second rotatable member in a position where the second rotatable member is closest to the first rotatable member on an outer peripheral surface of the second rotatable member is opposite to the rotational direction of the first rotatable member in a position where the first rotatable member is closest to the second rotatable member on an outer peripheral surface of the first rotatable member; and a second magnet provided non-rotatably and stationarily inside the second rotatable member, wherein the second magnet includes a plurality of magnetic poles including a second developing pole provided opposed to the image bearing member in the second developing position, a receiving pole provided upstream of the second developing pole with respect to the rotational direction of the second rotatable member and having a magnetic polarity different from that of the delivering pole, and a second feeding pole provided downstream of the receiving pole and adjacent to the receiving pole, with respect to the rotational direction of the second rotatable member, and having a magnetic polarity different from that of the receiving pole, the receiving pole being a magnetic pole, of the plurality of magnetic poles, provided closest to the delivering pole, wherein in a case where an absolute value of a maximum of a magnetic flux density of the second feeding pole in a normal direction relative to an outer peripheral surface of the second rotatable member is MA, a position, on the outer peripheral surface of the second rotatable member, where the magnetic flux density of the second feeding pole in the normal direction relative to the outer peripheral surface of the second rotatable member is maximum is a point A, an absolute value of a maximum of a magnetic flux density of the first feeding pole in a normal direction relative to an outer peripheral surface of the first rotatable member is MB, a position, on the outer peripheral surface of the first rotatable member, where the magnetic flux density of the first feeding pole in the normal direction relative to the outer peripheral surface of the first rotatable member is maximum is a point B, an absolute value of a maximum of a magnetic flux density of the delivering pole in the normal direction relative to an outer peripheral surface of the first rotatable member is MC, a position, on the outer peripheral surface of the first rotatable member, where the magnetic flux density of the delivering pole in the normal direction relative to the outer peripheral surface of the first rotatable member is maximum is a point C, a rectilinear line distance between the point A and the point B is L1, a rectilinear line distance between the point A and the point C is L2, and an angle formed by a rectilinear line AB connecting the point A and the point B and a rectilinear line AC connecting the point A and the point C is θ, the following relationship is satisfied:

$$MB/L1^2 \leq (MC/L2^2) \times \cos\theta.$$

.

2. A developing device according to claim 1, wherein the following relationship is further satisfied:

MA≥MB>MC.

3. A developing device according to claim 1, wherein in a case where an absolute value of a maximum of a magnetic flux density of the receiving pole in the normal direction relative to the outer peripheral surface of the second rotatable member is MD, the following relationship is further satisfied:

MC≤MD.

4. A developing device according to claim 1, wherein in a case where an absolute value of a maximum of a magnetic flux density of the receiving pole in the normal direction relative to the outer peripheral surface of the second rotatable member is MD, the following relationship is further satisfied:

MC<MD.

5. A developing device according to claim 1, wherein the following relationship is further satisfied:

L1>L2.

6. A developing device according to claim 1, wherein in a case where an absolute value of a maximum of a magnetic flux density of the receiving pole in the normal direction relative to the outer peripheral surface of the second rotatable member is MD, a position, on the outer peripheral surface of the second rotatable member, where the magnetic flux density of the receiving pole in the normal direction relative to the outer peripheral surface of the second rotatable member is maximum is a point D, a rectilinear line distance between the point B and the point D is L3, and an angle formed by the rectilinear line AB connecting the point A and the point B and a rectilinear line BD connecting the point B and the point D is θ', the following relationship is satisfied:

$$MA/L1^2 \leq (MD/L3^2) \times \cos\theta'.$$

7. A developing device according to claim 6, wherein the following relationship is further satisfied:

MB≥MA>MD.

8. A developing device according to claim 6, wherein the following relationship is further satisfied;

MD≤MA.

9. A developing device according to claim 6, wherein the following relationship is further satisfied:

MD<MA.

10. A developing device according to claim 6, wherein the following relationship is further satisfied:

L1>L3.

11. A developing device according to claim 1, wherein a rotation center of the second rotatable member is positioned above a rotation center of the first rotatable member with respect to a vertical direction.

12. A developing device comprising:

a developing container configured to accommodate a developer including toner and a carrier;

a first rotatable member to which the developer accommodated in the developing container is supplied and which carries and feeds the developer to a first developing position where an electrostatic latent image formed on an image bearing member is developed;

a first magnet provided non-rotatably and stationarily inside the first rotatable member, wherein the first magnet includes a first developing pole provided opposed to the image bearing member in the first developing position, a delivering pole provided downstream of the first developing pole with respect to a rotational direction of the first rotatable member, and a first feeding pole provided upstream of the delivering pole and adjacent to the delivering pole, with respect to the rotational direction of the first rotatable member, and having a magnetic polarity different from the delivering pole;

a second rotatable member provided opposed to the first rotatable member and to which the developer is delivered from the first rotatable member by a magnetic field generated by the first magnet, wherein the second rotatable member carries and feeds the developer to a second developing position where the electrostatic latent image is developed, and wherein a rotational direction of the second rotatable member in a position where the second rotatable member is closest to the first rotatable member on an outer peripheral surface of the second rotatable member is opposite to the rotational direction of the first rotatable member in a position where the first rotatable member is closest to the second rotatable member on an outer peripheral surface on the first rotatable member; and a second magnet provided non-rotatably and stationarily inside the second rotatable member, wherein the second magnet includes a plurality of magnetic poles including a second developing pole provided opposed to the image bearing member in the second developing position, a receiving pole provided upstream of the second developing pole with respect to the rotational direction of the second rotatable member and having a magnetic polarity different from that of the delivering pole, and a second feeding pole provided downstream of the receiving pole and adjacent to the receiving pole, with respect to the rotational direction of the second rotatable member, and having a magnetic polarity different from that of the receiving pole, the receiving pole being a magnetic pole, of the plurality of magnetic poles, provided closest to the delivering pole, wherein in a case where an absolute value of a maximum of a magnetic flux density of the second feeding pole in a normal direction relative to an outer peripheral surface of the second rotatable member is MA, a position, on the outer peripheral surface of the second rotatable member, where the magnetic flux density of the second feeding pole in the normal direction relative to the outer peripheral surface of the second rotatable member is maximum is a point A, an absolute value of a maximum of a magnetic flux density of the first feeding pole in a normal direction relative to an outer peripheral surface of the first rotatable member is MB, a position, on the outer peripheral surface of the first rotatable member, where the magnetic flux density of the first feeding pole in the normal direction relative to the outer peripheral surface of the first rotatable member is maximum is a point B, an absolute value of a maximum of a magnetic flux density of the receiving pole in the normal direction relative to an outer peripheral surface of the second rotatable member is MD, a position, on the outer peripheral surface of the second rotatable member, where the magnetic flux density of the receiving pole in the normal direction relative to the outer peripheral surface of the second rotatable member is maximum is a point D, a rectilinear line distance between the point A and the point B is L1, a rectilinear line distance between the point B and the point D is L3, and an angle formed by a rectilinear line AB connecting the point A and the point B and a rectilinear line BD connecting the point B and the point D is θ', the following relationship is satisfied:

$$MA/L1^2 \leq (MD/L3^2) \times \cos\theta'.$$

13. A developing device according to claim 12, wherein the following relationship is further satisfied:

$$MB \geq MA > MD.$$

14. A developing device according to claim 12, wherein the following relationship is further satisfied;

$$MD \leq MA.$$

15. A developing device according to claim 12, wherein the following relationship is further satisfied:

$$MD < MA.$$

16. A developing device according to claim 12, wherein the following relationship is further satisfied:

$$L1 > L3.$$

17. A developing device according to claim 12, wherein a rotation center of the second rotatable member is positioned above a rotation center of the first rotatable member with respect to a vertical direction.

* * * * *